United States Patent
Kato et al.

(10) Patent No.: US 6,199,983 B1
(45) Date of Patent: Mar. 13, 2001

(54) APPARATUS AND METHOD FOR MANUFACTURING A PROGRESSIVE MULTI-FOCAL LENS

(75) Inventors: Kazutoshi Kato; Akira Komatsu; Hiroyuki Mukaiyama; Tadashi Kaga, all of Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/091,191

(22) PCT Filed: Oct. 14, 1997

(86) PCT No.: PCT/JP97/03705

§ 371 Date: Jun. 10, 1998

§ 102(e) Date: Jun. 10, 1998

(87) PCT Pub. No.: WO98/16862

PCT Pub. Date: Apr. 23, 1998

(30) Foreign Application Priority Data

Oct. 14, 1996 (JP) .................................................. 8-291048
Mar. 24, 1997 (JP) .................................................. 9-070243

(51) Int. Cl.$^7$ .................................................. G02C 7/06
(52) U.S. Cl. .................................................. 351/169; 351/177
(58) Field of Search .................................................. 351/168, 169, 351/170, 171, 172, 177, 178

(56) References Cited

U.S. PATENT DOCUMENTS 5,444,503  *  8/1995  Kelch et al. .......................... 351/169
5,861,934  *  1/1999  Blum et al. .......................... 351/169

FOREIGN PATENT DOCUMENTS 63-271223   11/1988  (JP) .
3-206417    9/1991   (JP) .

* cited by examiner

Primary Examiner—Scott J. Sugarman
(74) Attorney, Agent, or Firm—Oliff & Berridge, PLC

(57) ABSTRACT

A manufacturing method of a progressive multi-focal lens which has a progressive surface area comprising a distance portion and a near portion, which have different refractive powers, and a progressive portion positioned between them in which the refractive power changes progressively. The progressive surface which reflects customized information for each individual user including at least one of the information concerning each individual user's eyes or lifestyle of the user is designed. A lens design process provides processing data for the progressive multi-focal lenses with the custom-made progressive surfaces. By so doing, it is possible to provide the most appropriate spectacle lenses for the users and, at the same time, it is possible to eliminate the process of storing lenses in a semi-finished state after being processed so that it is possible to provide lenses which are suited to users at a lower cost.

12 Claims, 14 Drawing Sheets

| NEAR/FAR | 5mm | 10mm | 15mm | 20mm | 25mm | 30mm | 35mm | 40mm | 45mm | 50mm |
|---|---|---|---|---|---|---|---|---|---|---|
| 2mm | INTERMEDIATE 1 | INTERMEDIATE 2 | INTERMEDIATE 3 | INTERMEDIATE 4 | INTERMEDIATE 5 | INTERMEDIATE 6 | INTERMEDIATE 7 | FAR INTERMEDIATE 1 | FAR USE 1 | FAR USE 2 |
| 4mm | INTERMEDIATE 8 | INTERMEDIATE 9 | INTERMEDIATE 10 | INTERMEDIATE 11 | INTERMEDIATE 12 | INTERMEDIATE 13 | INTERMEDIATE 14 | FAR INTERMEDIATE 2 | FAR USE 3 | FAR USE 4 |
| 6mm | INTERMEDIATE 15 | INTERMEDIATE 16 | INTERMEDIATE 17 | INTERMEDIATE 18 | INTERMEDIATE 19 | INTERMEDIATE 20 | INTERMEDIATE 21 | FAR INTERMEDIATE 3 | FAR USE 5 | FAR USE 6 |
| 8mm | INTERMEDIATE 22 | INTERMEDIATE 23 | INTERMEDIATE 24 | INTERMEDIATE 25 | INTERMEDIATE 26 | INTERMEDIATE 27 | INTERMEDIATE 28 | FAR INTERMEDIATE 7 | FAR INTERMEDIATE 8 | FAR INTERMEDIATE 9 |
| 10mm | INTERMEDIATE NEAR 1 | INTERMEDIATE NEAR 2 | INTERMEDIATE NEAR 3 | INTERMEDIATE NEAR 4 | INTERMEDIATE NEAR 5 | INTERMEDIATE NEAR 6 | INTERMEDIATE NEAR 7 | BALANCED 1 | BALANCED 2 | BALANCED 3 |
| 12mm | INTERMEDIATE NEAR 8 | INTERMEDIATE NEAR 9 | INTERMEDIATE NEAR 10 | INTERMEDIATE NEAR 11 | INTERMEDIATE NEAR 12 | INTERMEDIATE NEAR 13 | INTERMEDIATE NEAR 14 | BALANCED 4 | BALANCED 5 | BALANCED 6 |
| 14mm | INTERMEDIATE NEAR 15 | INTERMEDIATE NEAR 16 | INTERMEDIATE NEAR 17 | INTERMEDIATE NEAR 18 | INTERMEDIATE NEAR 19 | INTERMEDIATE NEAR 20 | INTERMEDIATE NEAR 21 | BALANCED 7 | BALANCED 8 | BALANCED 9 |
| 16mm | INTERMEDIATE NEAR 22 | INTERMEDIATE NEAR 23 | INTERMEDIATE NEAR 24 | INTERMEDIATE NEAR 25 | INTERMEDIATE NEAR 26 | INTERMEDIATE NEAR 27 | INTERMEDIATE NEAR 28 | FAR NEAR 1 | FAR NEAR 2 | FAR NEAR 3 |
| 18mm | FAR USE 1 | FAR USE 2 | FAR USE 3 | FAR USE 4 | FAR USE 5 | INTERMEDIATE NEAR 29 | INTERMEDIATE NEAR 30 | FAR NEAR 4 | FAR NEAR 5 | FAR NEAR 6 |
| 20mm | NEAR USE 6 | NEAR USE 7 | NEAR USE 8 | NEAR USE 9 | NEAR USE 10 | INTERMEDIATE NEAR 31 | INTERMEDIATE NEAR 32 | FAR NEAR 7 | FAR NEAR 8 | FAR NEAR 9 |

FIG. 5

| OCCUPATION | BASIC PARAMETERS |
|---|---|
| ATTORNEY | INTERMEDIATE-NEAR 4 |
| PHYSICIAN | INTERMEDIATE-NEAR 13 |
| SPORTS COACH | FAR-INTERMEDIATE 2 |
| GOLF PLAYER | FAR-USE 2 |
| | |

| SPHERICAL POWER | 0.00 | 0.25 | 0.50 | 0.75 | 1.00 | 1.25 | 1.50 | 1.75 | 2.00 | 2.25 | 2.50 | 2.75 | 3.00 | 3.25 | 3.50 | 3.75 | 4.00 |
|---|---|---|---|---|---|---|---|---|---|---|---|---|---|---|---|---|---|
| ⋮ | | | | | | | | | | | | | | | | | |
| 2.00 | 4.00 | 4.00 | 4.00 | 4.00 | 4.00 | 4.00 | 4.00 | ⋮ | | | | | | | | | |
| 1.75 | 3.75 | 3.75 | 3.75 | 3.75 | 3.75 | 3.75 | 3.75 | ⋮ | | | | | | | | | |
| 1.50 | 3.50 | 3.50 | 3.50 | 3.50 | 3.50 | 3.50 | 3.50 | ⋮ | | | | | | | | | |
| 1.25 | 3.25 | 3.25 | 3.25 | 3.25 | 3.25 | 3.25 | 3.25 | ⋮ | | | | | | | | | |
| 1.00 | 3.00 | 3.00 | 3.00 | 3.00 | 3.00 | 3.00 | 3.00 | ⋮ | | | | | | | | | |
| ⋮ | | | | | | | | | | | | | | | | | |

FIG. 8

| | OCCUPATION |
|---|---|
| GROUP A | SPORTS PLAYER, DRIVER, SALES ......... |
| GROUP B | RETAIL DEALER, TEACHER, DOCTOR, HOUSEWIFE, RESTAURATEUR, GARDENER, MUSICIAN ...... |
| GROUP C | ENGINEER, PLANNER, OFFICE WORKER, ILLUSTRATOR ............ |

FIG. 9

| | HOBBY |
|---|---|
| GROUP A | DRIVING, FISHING, GOLF, WALKING, WATCHING DRAMA, SHOPPING .......... |
| GROUP B | BONSAI, COOKING, PINBALL GAME, PHOTOGRAPHY .......... |
| GROUP C | PATCH WORK, READING, CHESS, PLAYING GO, FLOWER ARRANGEMENT, TEA CEREMONY ...... |

FIG. 10

APPARATUS AND METHOD FOR MANUFACTURING A PROGRESSIVE MULTI-FOCAL LENS

BACKGROUND OF THE INVENTION

1. Field of the Invention

The present invention relates to a method and apparatus for manufacturing a progressive multi-focal lens for visual acuity correction, and to a progressive multi-focal lens and a spectacle lens manufactured by the method.

2. Description of Related Art

A progressive multi-focal lens is a lens which has two distinctive visual-field portions with different refractive powers and a visual-field portion therebetween in which the refractive power progressively changes. There is no border separating these visual-field portions, which makes their appearance excellent. Further, it is possible to obtain other visual fields of different refractive power in one lens. For these reasons, a spectacle lens is used which has a function of correcting visual acuity such as presbyopia. In many progressive multi-focal lenses, a distance portion which is a visual-fieled portion for seeing objects at long distances is arranged in an upper position, and a near portion, which is a visual-field portion which has different refractive power from the distance portion for seeing objects at short distances, is arranged below the distance portion. Furthermore, these distance and near portions are smoothly connected by a progressive portion, which is a visual-field portion with a refractive power which continually changes in order to see objects at intermediate distances between the long and short distances. Therefore, even a user whose eyesight adjustment power has deteriorated due to progressive presbyopia can gain a clear visual field, focusing at both far and near distances by using spectacles which use progressive multi-focal lenses. Moreover, as for the distance between near and distance portions, because the refractive power progressively changes, it is possible to gain a clear visual field even at an intermediate distance. Therefore, progressive multi-focal lenses are favorably used by many users as spectacle lenses and it is conceivable that they will be used by more users for different purposes in the future.

A progressive multi-focal lens has at least two areas with different refractive powers and a progressive surface which continuously changes between these two areas through a progressive portion. Therefore, since this progressive portion is not simply a spherical surface, the curvature of at least one area of progressive surface is different in two orthogonal directions and because of this, astigmatic aberration occurs. However, for example, for a user with spectacles without astigmatism, if the astigmatic aberration which appears in a lens is 1.0 diopter or less, preferably 0.5 diopters or less, it is possible to obtain a clear vision with little perceptible blurring of the image. Therefore, for a driver or a user who likes sports, who often sees far, a progressive multi-focal lens in which a wide clear vision area to obtain clear vision in a distance portion is preferable. Meanwhile, for a clerical worker or a user whose hobby is knitting or the like, who often sees near, it is preferable to use a progressive multi-focal lens in which a wide clear vision area is in a near portion. As described earlier, in a progressive multi-focal lens, lens power suited to a visual acuity of the user is needed, and further, it is preferable to change the lens power depending upon the purpose of the spectacles.

Furthermore, for the movement of a person's eyes from a far distance to a near distance, the movement of the eyeballs converges toward the nose. Because of this, it is preferable for the main focus visual line which extends from the distance portion to the near portion to curve this convergence by adjusting convergence of the eye slightly toward the nose and to arrange a clear vision area along the main visual line. Because the amount of the convergence varies depending upon the user, it is not possible to sufficiently obtain a clear visual field unless the progressive multi-focal lens has a clear vision area which is suitable to the user. Other than that, several elements exist which affect matching between a progressive multi-focal lens and the user, such as a rotation angle and a progressive band.

As described earlier, if a user tries to obtain a comfortable visual field, it is necessary to select a progressive multi-focal lens after considering the above points.

Conventionally, as shown in FIG. 14, a basic progressive multi-focal lens system is used which has progressive surfaces with several kinds of average optical characteristics formed in a convex side that are prepared by a manufacturer, and from among these, a lens which is considered to be suitable to the user is selected, and in which the concave side is processed depending upon the diopter of the user. A schematic process up to the time when the progressive multi-focal lens is shipped to market is explained as follows: First of all, in step 91, a manufacturer establishes a progressive surface which is suitable to several kinds of lenses, for example, a lens focused on far and intermediate distances, a lens focused on near and intermediate distances, and further, a lens balanced for far, intermediate, and near distances, depending upon an average purpose of the user, a movement of his eye, and the like, and a lens of a state in which the progressive surface is formed on a convex side is processed. Furthermore, in step 92, an inventory of processed semi-finished lenses is prepared. As shown in step 93, the user obtains information concerning his/her eyes such as the diopter, astigmatism, convergence, rotation angle, and the like in a spectacles store, or the like, determines the purpose of the spectacles, and selects lenses which he thinks are the most appropriate from among the semi-finished lenses. The task of selecting appropriate lenses from among the semi-finished lenses often requires professional knowledge, so this work is normally performed by a store or a manufacturer, and there are cases when software is used for selection.

In step 95, the selected concave surface of the lenses is processed to the diopter which is suitable to the user including the astigmatism correction, and the lenses are shipped to market in step 96. During processing, processing shape is determined in response to the spectacles frame which the user has selected, and further, additional work such as color coating is performed, if requested. After passing through processing such as this, a lens which is suitable to the user is selected from among the manufacturing group which the manufacturer prepared, and delivered to the user. Furthermore, as user information which is obtained in step 93 is more thoughtfully considered, a lens which can obtain a comfortable vision field which meets the needs of the user can be provided from among the manufacturing group prepared in a semi-finished state.

In order to select a product which is suitable to a user, semi-finished lenses need to be stored in stock which can meet the needs of the user. However, kinds which can be manufactured in a semi-finished state are limited in order to keep the number or volume to be stored in an appropriate scope, and are limited to several kinds such as the far-use focused outdoor type, far-, intermediate-, near-balanced for the wide-use type, and the intermediate- and near-focused indoor type which are average and are in great demand.

Therefore, a user can only select the most appropriate lens from among the kinds of progressive multi-focal lenses which are already prepared and cannot always wear the most appropriate lenses for himself.

SUMMARY OF THE INVENTION

Accordingly, an objective of the present invention is to provide a manufacturing method and manufacturing apparatus which can provide progressive multi-focal lenses which are most suitable to an individual user which are suitable to the user's lifestyle, and to the condition or movement of the eyes. In particular, progressive multi-focal lenses can obtain a clear visual field from far to near even if the user's adjusting power of visual acuity has deteriorated, while the area which can be obtained as a clear vision field is limited because the refractive power of each part of the lenses is different. Therefore, it is impossible to provide the best lenses for a plurality of users with the same progressive multi-focal lenses because the usage environment by an individual user varies depending upon the usage purpose of the spectacles, personal history, the condition and movement of eyes, or the like. Because of this, an objective of the present invention is to provide progressive multi-focal lenses which have progressive surfaces which match the movement of the individual user's eyes and his lifestyle and to provide spectacles with which individual users who have different usage environments can comfortable obtain a vision field at any time.

Because of this, in the present invention, which is different from the conventional manufacturing method in which a manufacturer prepares progressive multi-focal lenses which have progressive surfaces with basic capability performance, and the user selects from among them, or a manufacturer selects and provides the lenses for the user based upon the user's information. First of all, progressive surfaces are designed, based upon the information of individual users. The progressive multi-focal lenses (hereafter referred to as lenses which are custom-made, or custom-made lenses) which have progressive surfaces (hereafter referred to as custom-made progressive surfaces) are processed, and then provided to the users. That is, in the manufacturing method of the progressive multi-focal lenses of the present invention, in which distance and near portions have different refracting powers and have progressive surfaces which between them comprise progressive portions in which the refracting power progressively changes. And, lens design processing is included in which the progressive surfaces are designed which reflect customized information for individual users including at least one of information concerning the individual users' eyes and their lifestyles, leading to processing data for progressive multi-focal lenses which have custom-made progressive surfaces. By using the manufacturing method of the progressive multi-focal lenses of the present invention, the spectacle lenses can be provided to users by a completely new method which manufactures lenses with progressive surfaces suitable to the users, not by selecting the lenses which have progressive surfaces which are suitable to the users from among the prepared manufacturing group. Therefore, it is possible to definitely provide progressive multi-focal lenses which are most suited to the users by technology at the time when the lenses are provided. Further, when the capability performance improves due to the development of technology, progressive multi-focal lenses with excellent capability performance are provided to the users as technology develops. Furthermore, there is no need to store semi-finished lenses, so costs will go down and lenses which meet the needs of the users can be provided at a low price.

In the lens design process, by using a design parameter determination process which reflects the customized information in the design parameters of the progressive surfaces and a process which obtains coordinates data of the custom-made progressive surfaces based upon the design parameters, it is possible to obtain information concerning the diopter and movement of the user's eyes, and further, to design progressive surfaces which match information relating to the user's lifestyle such as jobs and hobbies, and to obtain the coordinates of the surfaces. In the present invention, progressive surfaces can be determined for individual users, so it is not limited to the several kinds of progressive surfaces with basic types of already-processed lenses in the prior art, and it is possible to introduce unique progressive surfaces to individual users and design unique custom-made progressive surfaces by referring to several tens or more of basic types to which can be retrieved. Because of this, by taking advantage of the characteristics of progressive surfaces in which can be designed in many kinds and purposes, it is possible to form a clear vision field along with the movement of the user's eyes, and to provide a clear vision field with a width suited to the user'lifestyle. Therefore, it is possible to provide progressive multi-focal lenses with custom-made progressive surfaces and spectacle lenses on which lens-shape processing was performed on custom-made progressive multi-focal lenses in order to always provide a comfortable vision field for the users.

In the present invention, based upon the customized information for individual users, the design of the progressive surfaces which are suitable to the users i performed so that the design of progressive surfaces can be implemented from various kinds of angles in order to be suitable to users. For example, as described earlier, it is possible to consider occupation as a portion of information of the user's lifestyle into the customized information and to perform the design of the progressive surfaces in response to the occupation. Furthermore, even though some users have the same occupation, the same progressive surfaces do not necessarily apply, so it is possible to provide at least first and second main lifestyle information in different categories such as occupation and hobbies which relate to the user's lifestyle in the customized information. Furthermore, it is possible to provide, for example, the time ratio of using the spectacles at work and hobbies, time used for hobbies, and the like as subsidiary lifestyle information reflecting the percentages in which the first and second main lifestyle information affects the user's eyes. Moreover, it is possible to provide spectacle lenses with progressive surfaces which are suitable to individual users reflecting the differences when those users that have the same occupation but different hobbies by providing, in the design parameter determination processing, a first basic parameter setting process which sets a basic parameter among the design parameters concerning the setting of a clear vision area of at least distance or near portions based upon the first main lifestyle information and a second basic parameter setting process which sets a basic parameter based upon the second main lifestyle information, adjusting the plurality of basic parameters which were set in the first and second basic parameter setting processes based upon the subsidiary lifestyle information, and providing a basic parameter adjusting process which is used for the design parameters of the progressive surfaces. Needless to say, the information is not limited to occupation and hobbies. It is possible to add gender, age, or the like as the main lifestyle information. Furthermore, by dividing one category such as hobbies into more detailed categories, it is possible to sue, for example, kinds of sports for hobbies as the main lifestyle information to select the basic parameters. Thus, it is possible to design or manufacture progressive multi-focal lenses which are suitable to individual users who have different lifestyles or the like by setting the design parameter based upon a plurality of information without being limited to one kind of information.

Furthermore, needs of users vary with respect to things such as feelings of discomfort with respect to the spectacle lenses, depending upon their personal history, for example, whether or not a user is used to the progressive multi-focal lenses, or whether the progressive multi-focal lenses which the user previously wore in the past matched their taste. Since the present invention starts from the design of the progressive surfaces, it is possible to include information such as this in the customized information and reflect upon the spectacle lenses. That is, personal history information concerning the spectacles of the user is provided in the customized information, and a basic parameter correction process which corrects the basic parameters provided in the basic parameter adjustment process by the personal history information is provided in the design parameter determination process, so it is possible to also provide spectacle lenses that reflect the differences depending upon the user's experiences.

In thus obtaining the coordinate data of the progressive surfaces, based upon the basic parameters arranged for each individual user, there are various methods such as obtaining a function which expresses the curved surface which is suitable to the basic parameters. Among these, by designing the progressive surface through a first diopter distribution determination process in which, first of all, the base curve of distance and near portions is set by a base curve setting process, according to diopter information relating to the diopter of the eyes of the user included in the customized information, and after that, the diopter distribution data which corresponds to the basic parameters is obtained from among the diopter distribution data group prepared in advance and the diopter distribution of distance and near portions for which the base curve is provided is determined, and through a second diopter distribution determination process which determines the diopter distribution of the progressive portion, based upon the diopter distribution of the distance and near portion information, it is possible to obtain a progressive surface with good performance capability which is suitable to an individual user. Design parameters such as the diopter distribution data can be selected from among the data group which is already filed, and it is also possible to obtain them by an interpolating method using a weighting function or the like.

Furthermore, in the present invention, when each progressive multi-focal lens is manufactured, because the design begins from a progressive surface, it is undoubtedly possible to use a process which determines the shape of a custom-made lens equipped with a custom-made progressive surface, based upon customized information such as a spectacles frame. Therefore, the shape of the lens is determined, depending upon a frame, diopter of astigmatism, and axis, and it is possible to provide a thin and light lens which is easily used, and which provides a comfortable visual field to the user.

Moreover, in the present invention, a progressive multi-focal lens which is suitable to an individual user can be provided by starting from the design of the progressive surface, so it is possible to correct progressive surfaces and data of other surfaces in order to improve optical performance capability by using fitting information such as camber angle and front inclination angle included in the customized information and provide a progressive multi-focal lens with optical characteristics which are suitable to the user. Furthermore, through the processing data which was obtained, based upon the customized information, lens processing collectively including the progressive surface can be performed, and it is possible to provide a progressive multi-focal lens which is suitable to a user in a short time. Therefore, a plurality of processing steps which process the semi-finished lens as in the past, and in which a concave surface of the semi-finished lens is processed in response to the user are not needed, and it is possible to provide a custom-made lens which is suitable to the user at a low price in a short time.

The method of manufacturing a progressive multi-focal lens of the present invention can be provided as software and can be provided by being stored in a memory medium such as a magnetic disk or CD-ROM. Furthermore, the following manufacturing apparatuses, equipped with a function to store appropriate processing functions and files, such as a personal computer, can be provided. That is, in the manufacturing apparatus of a progressive multi-focal lens having a progressive surface which comprises distance and near portions with different refractive power and a progressive part between them in which refractive power progressively changes, in the present invention, a progressive surface is designed reflecting customized information by a user including at least one of information concerning an individual user's eyes and information concerning the user's lifestyle, and there is a lens design component which obtains the processing data of a progressive multi-focal lens with a custom-made progressive surface. Furthermore, the lens design component has a design parameter determination component that reflects the customized information upon the design parameters of the progressive surface, the coordinate data obtaining component which obtains the coordinate data of the custom-made progressive surface, based upon the design parameters, a lens shape determination component which determines the shape of custom-made lens with a custom-made progressive surface, based upon the customized information, an optical performance capability correction component which corrects the shape of the custom-made lens, based upon the customized information, a processing data creation component which obtains the processing data of the corrected shape of the custom-made lens, a basic parameter file in which a plurality of basic parameters concerning at least the setting of a clear visual area of distance and near portions are prepared in advance, a diopter distribution data file in which diopter distribution of distance and near portions corresponding to the basic parameter is prepared in advance and a base curve file in which plural kinds of base curves which set the surface refractive power of a distance portions are prepared in advance. Furthermore, the design parameter determination component has a basic parameter selection component which selects the respective basic parameters from the basic parameter file, based upon at least he first and second main lifestyle information, respectively, which are related to the user's lifestyle included in the customized information, a basic parameter adjustment component which determines the basic parameters to be used for the design of the custom-made lens from a plurality of basic parameters selected by the basic parameter selection component, based upon the subsidiary lifestyle information included in the customized information that reflects the percentage in which the first and second main lifestyle information affect the user's eyes, a base curve selection component which selects the base curve for the distance and near portions from the base curve file, based upon the diopter information included in the customized information, a first diopter distribution determination component which determines the diopter distribution of distance and near portions, based upon the diopter distribution data of the diopter distribution data file, and a second diopter distribution determination component which determines the diopter distribution of the progressive portion, based upon the diopter distribution of distance and near portions. Furthermore, a basic parameter correction component which corrects the basic parameters can be arranged in the design parameter determination component, based upon the personal history information concerning the user's spectacles included in the customized information.

BRIEF DESCRIPTION OF THE DRAWINGS

FIG. 5 is a table showing a schematic of the basic parameters;

FIG. 6 is a table showing a schematic of an occupation file in which basic parameters are set, based upon the occupation;

FIG. 8 is a table which shows a schematic of a base curve file in which base curves are set;

FIG. 9 is a table which shows an example of selecting the type of the progressive multi-focal lens by occupation;

FIG. 10 is a table which shows an example of selecting the type of the progressive multi-focal lens by hobbies;

DETAILED DESCRIPTION OF THE PREFERRED EMBODIMENT

Figure 1:
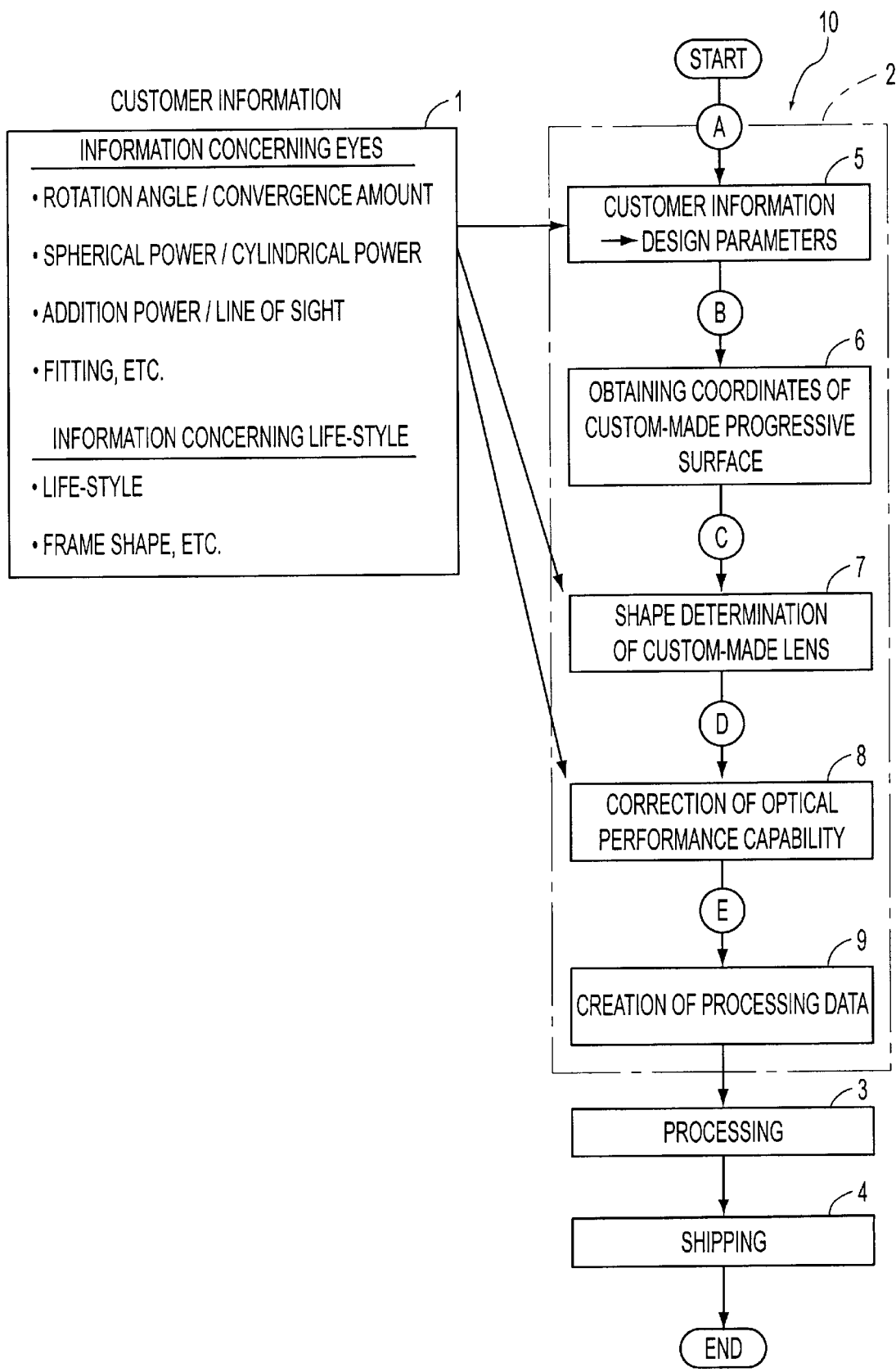
FIG. 1 is a flow chart showing the main manufacturing process of the progressive multi-focal lenses of the present invention.

The present invention is explained in further detail below with reference to the figures. FIG. 1 shows the main process of the method of manufacturing a progressive multi-focal lens by using a flow chart. In order to manufacture a progressive multi-focal lens of the present invention, first of all, customized information 1 for an individual user needs to be collected. In order to manufacture a custom-made progressive multi-focal lens which is suitable to the user, it is preferable to obtain the information concerning, roughly divided, the user's eyes and the user's lifestyle. The information concerning eyes includes the diopter (spherical power, when astigmatism needs to be corrected, and cylindrical power and axis), addition power showing the difference of the diopter between the distance and near portions, the pupil distance showing the position of the pupil, the convergence amount which is the motion of the eyes form the distance portion to the near portion, the rotation angle showing the range over which the eye balls performs the rotation movement, the movement of the line of sight, and the like. Furthermore, for the fitting data when wearing the spectacles, distance between top-most vertices of the corneas, which is the distance between the surface of the lens, the eyeball side and the cornea, the front inclination angle showing the angle between a perpendicular line of the face and the lens surface, the camber angle showing the inclination of right and left lenses, and the like can be included. The information concerning eyes can be mainly obtained by measuring the movement of eyes of the user at an optometrist, a store, or the like.

Meanwhile, as the information concerning the user's lifestyle, there is lifestyle information concerning the main usage of the spectacles such as occupation and hobby of the user, the personal history information of the compatibility and preference of the spectacles at the present and/or in the past, past experience with spectacles, or the like, and further, the frame shape for the spectacles which the user selected, and the like. The information concerning the lifestyle of the user can be obtained by methods such as interviews and surveys at an optometrist, a store, or the like.

[Schematic of the method of manufacturing a progressive multi-focal lens]

In the method of manufacturing a progressive multi-focal lens 10 of the present invention, design process 2 which designs the progressive multi-focal lens including the progressive surface, reflecting upon the customized information 1 collected as described above, and obtains the processing data, processing process 3 which manufactures a progressive multi-focal lens and the spectacle lens, based upon the processing data, and process 4 which ships the custom-made lens which is suitable to the user are provided. Therefore, the customized information 1 of the present example if the information to be used in order to manufacture a progressive multi-focal lens, not to select a lens which is suitable to the user from among ready-made spectacle lenses. Therefore, it is necessary to subsequently reflect this upon the design parameters, but it is not the answer to any one inquiry; that is, it is not information which leads to one of the ready-made lenses. Therefore, it is possible to include any kind of information which is considered to be relevant in order to obtain a comfortable visual field as the user uses the spectacles. Furthermore, in the manufacturing method of the present example, it is possible to manufacture a progressive surface which started from the design of the progressive surface and is custom-made, based upon the customized information, and further, to manufacture a lens which is custom-made with the progressive surface. Therefore, it is possible to provide spectacle lenses corresponding to individual users with many kinds and many purposes, and spectacle lenses can be provided for each user with which a comfortable visual field can be definitely obtained.

Furthermore, in the manufacturing method of the present example, by processing the lens through processing data which is obtained, based upon the customized information, it is possible to immediately manufacture a lens which can be shipped to the market by one process. Therefore, the conventional process which manufactures a lens in a semi-finished state is not needed, and it is possible to provide the custom-made lens which is suitable to the user at a low price in a short time. Moreover, it is not necessary to store the lens in a semi-finished state, so the costs will go down in that sense. Also, based upon the customized information, the design is performed from the progressive surface, so when there is any technology development to improve the performance capability of the progressive multi-focal lens, it is possible to provide a progressive multi-focal lens for the user in which the performance capability has improved along with the improvement in technology by upgrading the version of the design software. Furthermore, even if there are any changes in the lens specifications or renovations of the design, it is not necessary to change the information which is provided to the lens manufacturer, and it is possible to eliminate the troublesome work of selecting an appropriate lens from among many different kinds of lenses including old/new type of types with different purposes.

Each process included in the design process 2 of the present example is explained in further detail. The design process 2 of the present example has a design parameter determination process 5 which reflects the information concerning the design of the progressive surface from the customized information 1 upon the design parameters, a process 6 which sets the progressive surface and obtains the coordinates of the custom-made progressive surface, based upon these design parameters, a process 7 which determines the lens shape which has the custom-made progressive surface, based upon the customized information 1 such as the frame shape, a process 8 which corrects the progressive surface and lens shape which were provided above, in order to optimize the optical performance capability, based upon the fitting data included in the customized information 1, and further, a process 9 which creates the processing data of the lens which was determined as stated above.

[Schematic of the manufacturing apparatus of the progressive multi-focal lens]

Figure 2:
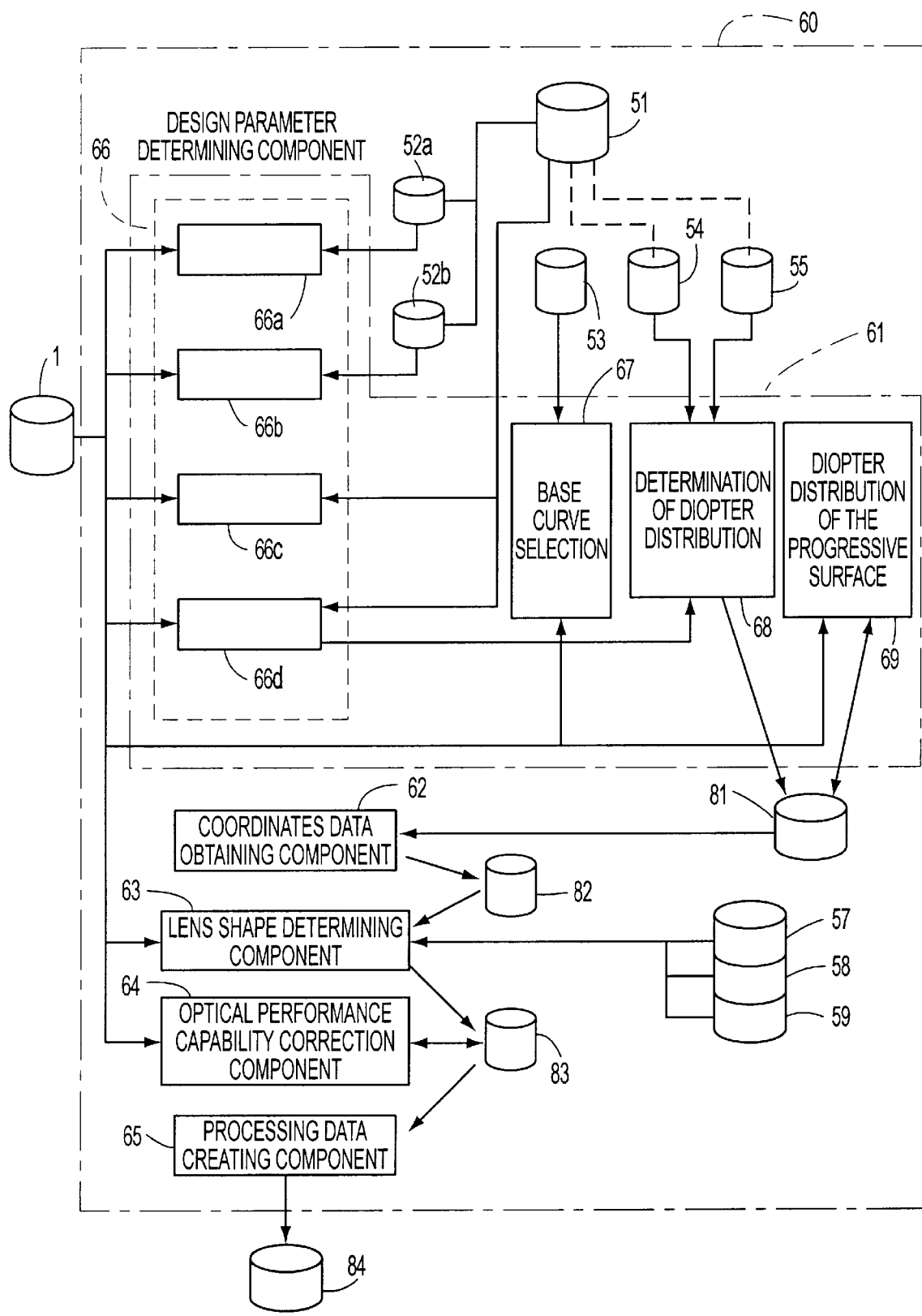
FIG. 2 is a flow chart showing a schematic of the manufacturing apparatus of the progressive multi-focal lens of the present invention.

The manufacturing method of the progressive multi-focal lens of the present invention which has processes as described above can be provided as software and can be provided after being stored in a memory medium such as a magnetic disk or CD-ROM. Furthermore, it is possible to use a processing apparatus which has a function to store appropriate processing functions and files, and the like, such as a personal computer, as a manufacturing apparatus 60 of the progressive multi-focal lens, and the main composition of the manufacturing apparatus is shown in FIG. 2. The manufacturing apparatus 60 of the present example has, corresponding to the above-mentioned processes 5 to 9, respectively, a design parameter determination component 61 which determines the design parameters for the custom-made lenses and obtains the coordinate distribution of the custom-made progressive surface, a coordinate data obtaining component 62 which obtains the coordinates of the custom-made progressive surface, a lens shape determination component 63 which determines the lens shape which is suitable to individual users, based upon the customized information such as the coordinates and diopter, an optical performance capability correction component 64 which corrects the custom-made lens shape in order to optimize the optical performance capability, based upon the fitting information and the like of individual users included in the customized information, and further, a processing data creating component 65 which obtains the numerical value data for the lens processing from the coordinate data which was thus determined. Furthermore, the manufacturing apparatus 60 of the present example also has the file group in which each kind of data created in advance is stored.

For example, a basic parameter file 51 which has a basic design type that defines specifically in advance the types of basic parameters which combine the far-/near-use clear vision areas, a base curve file 53 which is prepared so that the optimized base curve which is given the surface refractive power of the curved surface by the spherical diopter and astigmatism diopter of the user can be arranged, and a distance portion diopter distribution file 54 and a near portion diopter distribution file 55 which are prepared in order to obtain the diopter distribution in the horizontal direction of the distance and near portions from the basic parameters are provide. The data stored in these file is used for the processing of the design parameter determination component 61, and enables the design of many kinds of progressive surfaces with many purposes in a short time.

The coordinate distribution of the progressive surface which is determined in the design parameter determination component 61 is output to a coordinate distribution data file 81, and the coordinate data which is obtained by the coordinate data obtaining component 62 is output to a coordinate data file 82, based upon the coordinate distribution data. The lens shape determination component 63 determines the lens shape from the selected value, based upon the coordinate data of the coordinate data file 82, a lens diameter file 57, and customized information from a minimum center thickness file 58 and a minimum rim thickness file 59, and numerical value data showing the lens shape is output to a lens shape file 83. Furthermore, the optical performance capability correction component 64 corrects the shape of the lens shpe file 83, based upon the optical characteristics, and the processing data creating component 65 obtaining the processing data from the numerical value data showing the corrected lens shape and outputs the processing data to a processing data file 84. This processing data is transferred to an NC machine or the like, and spectacle lenses which are most suitable to the individual users are formed and provided to the users.

The further explanations of the manufacturing apparatus and each process of the method of manufacturing of the progressive multi-focal lens as described above are given below with reference to the flow chart of each process.

[Schematic of the design parameter determination process]

Figure 3A:
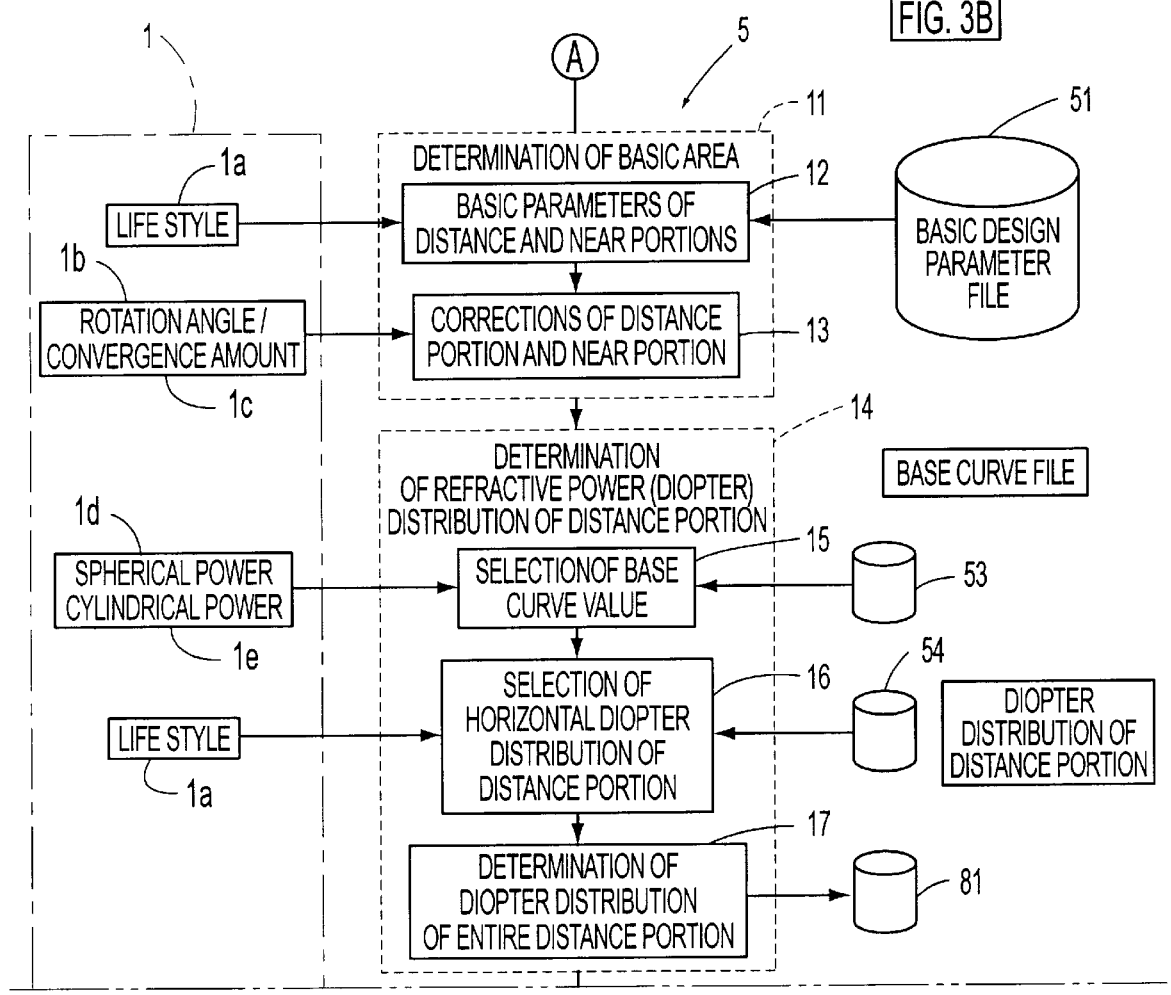
FIG. 3 is a flow chart showing the process in further detail reflecting the customized information upon the design parameters from among the flow chart shown in FIG. 1.
Figure 3B:
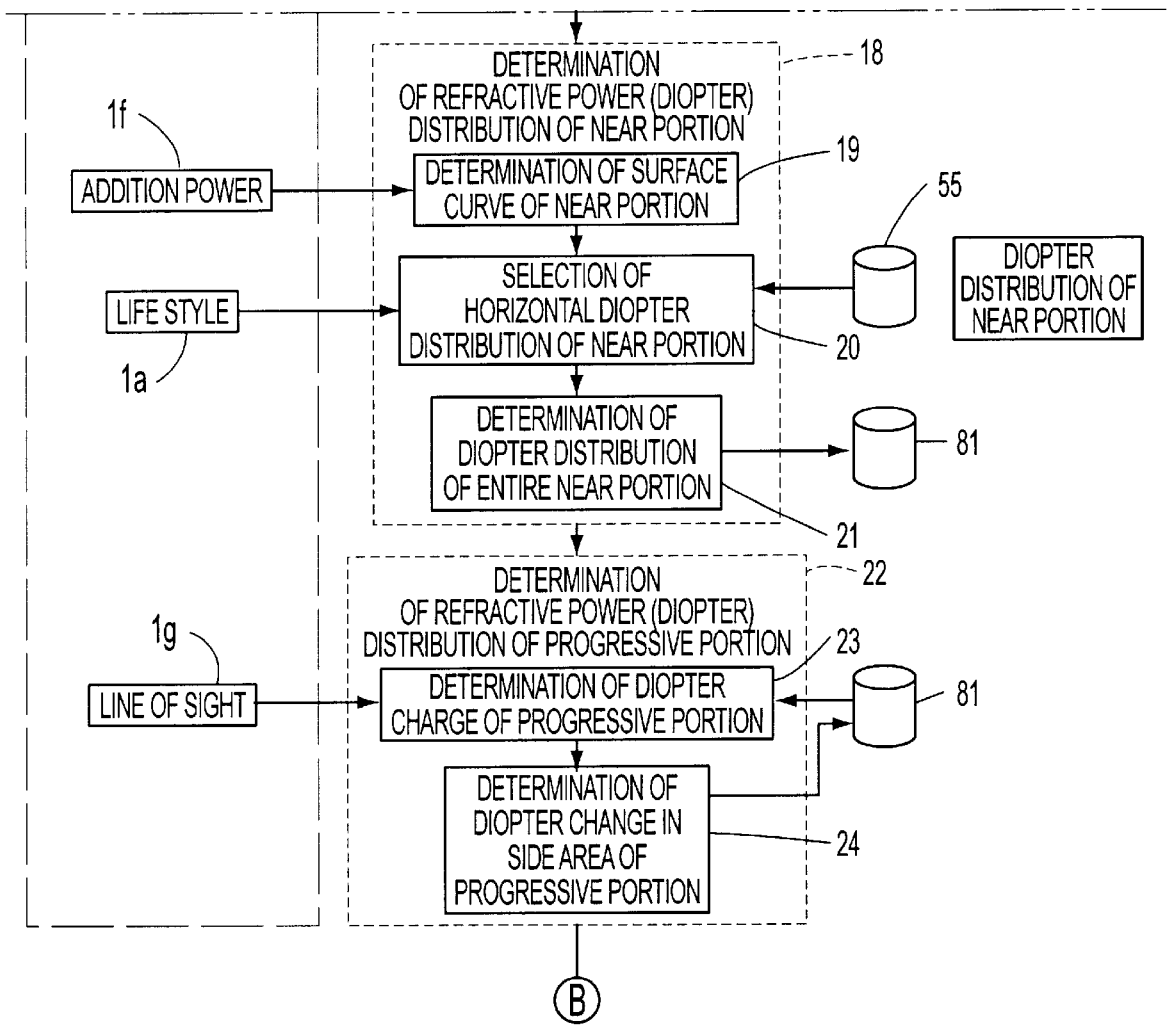

As shown in FIG. 3, the design parameter determination process 5 which reflects the customized information 1 of the present example upon the design parameters has, as general processing steps, step 11 which performs the determination of the far-/near-use basic parameters concerning the basic performance capability of the progressive multi-focal lenses, step 14 which determines the diopter, i.e., refractive power, distribution of the distance portion by obtaining the base curve in response to the basic parameters, step 18 which determines the diopter distribution of the near portion in response to the basic parameters, and step 22 which determines the diopter distribution of the progressive part, based upon the distribution. Corresponding to these, the design parameter determination component 61 of the manufacturing apparatus 60 of the present example has a basic parameter setting component 66 which performs the process of step 11, a base curve selection component 67 which performs setting of the base curve of the distance and near portions in steps 14 and 18, a first diopter distribution determination component 68 which determines the diopter distribution of the distance and near portions, and a second diopter distribution determination component 69 which determines the diopter distribution of the entire progressive surfaces, based upon the diopter distribution, and the determined diopter distribution is output to the diopter coordinate distribution data file 81.

Figure 13:
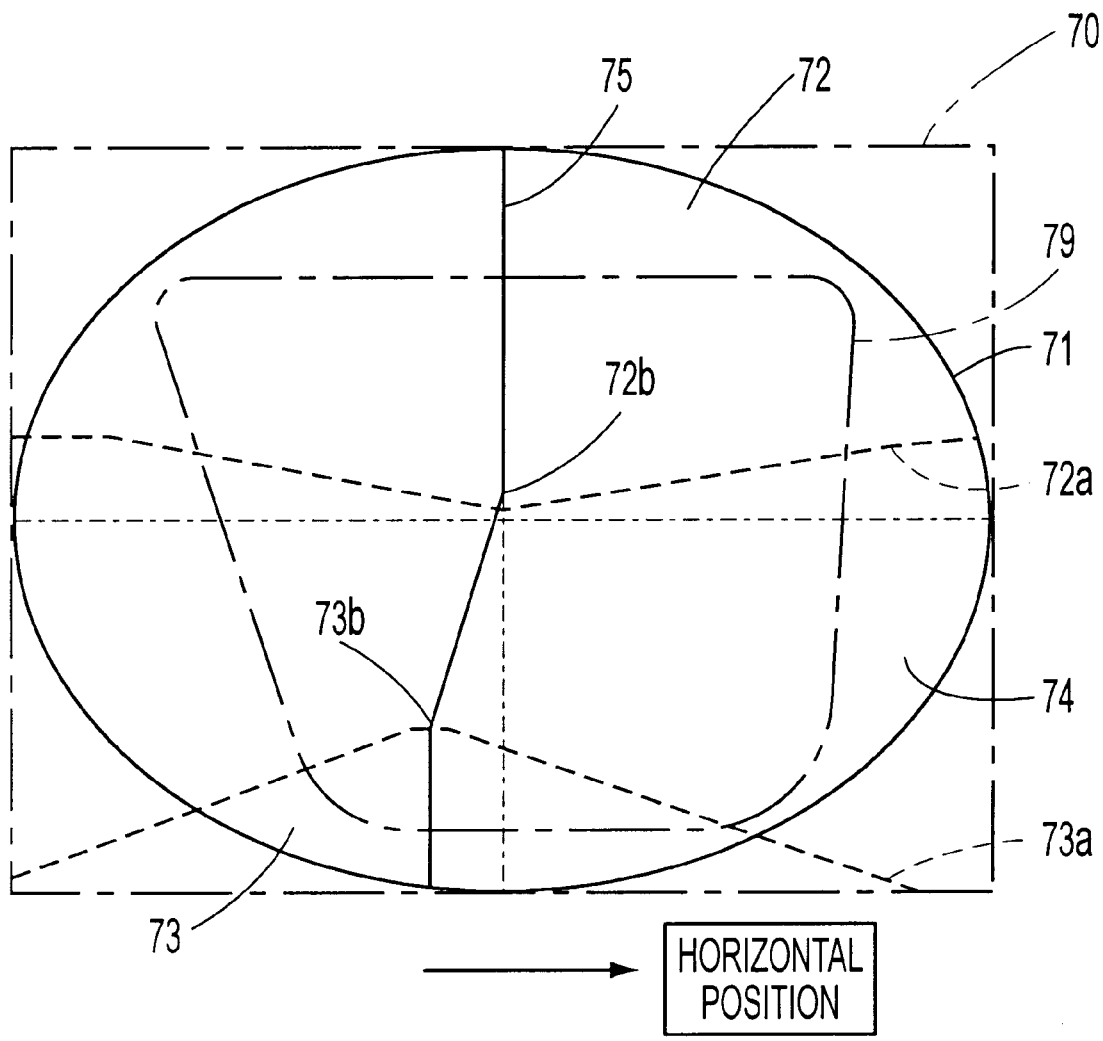
FIG. 13 is a diagrammatic view which explains the schematic composition of the progressive multi-focal lens and the spectacle lens.
Figure 14:
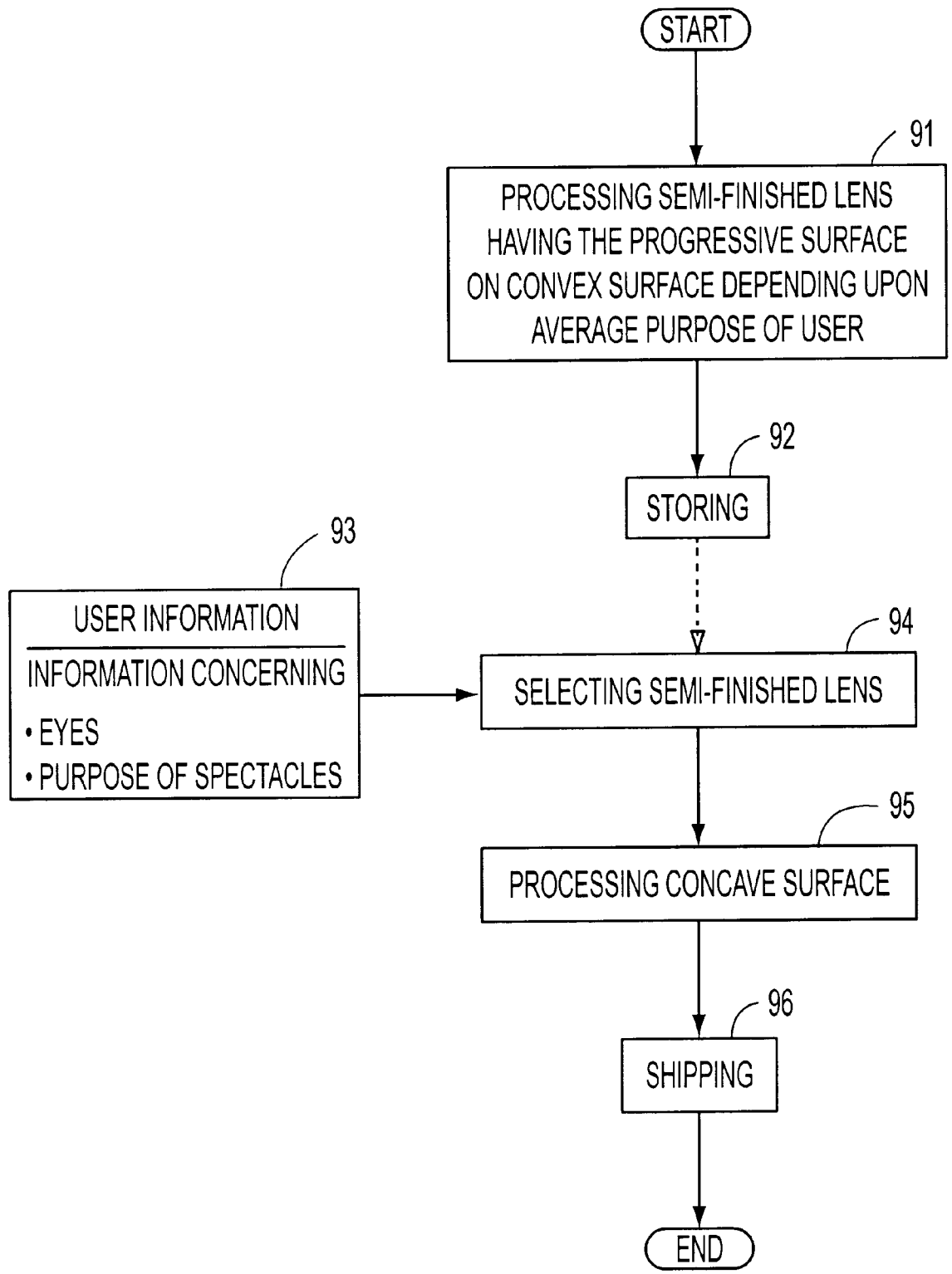
FIG. 14 is a flow chart which shows a schematic of the manufacturing process of a conventional progressive multi-focal lens.

In the method of manufactuirng of the progressive multi-focal lens of the present example, first of all, in the step 11, the setting of the basic area of the progressive multi-focal lenses is performed. Therefore, according to the information concerning a lifestyle 1a such as occupation, hobby, place/scope of activity, post type/evaluation of spectacles, etc. of the customized information 1, in step 12, the basic position and width of the distance and near portions are determines. In the present example, the progressive surfaces and the progressive multi-focal lenses which are customized for the individual users are designed by computer progressing, and the design processing can be performed in a short time by obtaining the processing data. Furthermore, by using computer processing, it is possible to select the most appropriate parameter from among many parameters in a short time and process it quickly even if it is a design parameter that includes complicated functions, so it is possible to provide progressive surfaces and progressive multi-focal lenses which are customized for more customer bases. In the step 12 which selects the basic parameters which determine the position and width of the distance and near portions, several tens of more of basic parameter types are arranged in advance in the basic parameter file 51, and the basic design type which is suitable to the lifestyle information 1a is selected from among them. For example, as shown in FIG. 13, a distance portion area boundary line 72a is arranged in a progressive surface area 71 of a progressive multi-focal lens 70 and the position and width of a distance portion 72 are determined. Unlike the conventional process of selecting an appropriate lens from among several kinds of semi-finished lenses, in the manufactuirng method of the present example, it is possible to specifically select an appropriate lens from among several tens or more of basic patterns because the design of the progressive surface area 71 is in the initial step. For example, it is possible to freely change the position, angle, and also the curvature of the like of the distance portion area boundary line 72a, and by so doing, it is possible to set the position and width of the distance portion.

[The method of setting the basic parameters]

Figure 4:
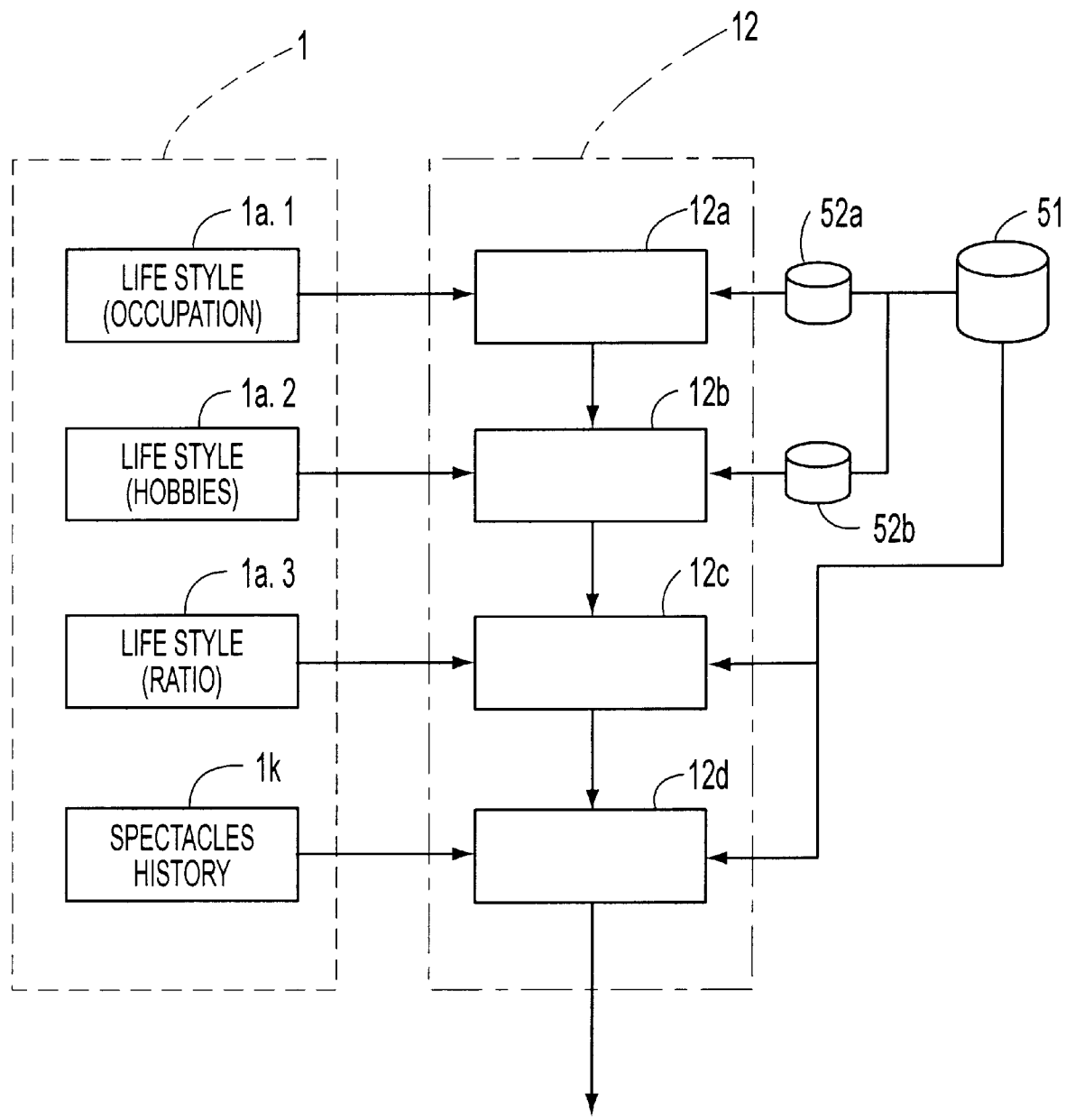
FIG. 4 is a flow chart showing the process in further detail which determines the basic parameter from among the flow chart shown in FIG. 3.

FIG. 4 shows the flow of the process of step 12, which is the process of setting the basic parameters of the present example, in further detail. In the manufacturing method of the present example, when the width of the distance/near clear vision area is set, in order for the user to obtain a comfortable visual field, the basic parameters of the spectacles which are suitable to the individual user can be provided by the information concerning the user's lifestyle. As for the information concerning the user's lifestyle to set the basic parameters, as described above, occupation, hobbies, and the like (hereafter referred to as the main lifestyle information) which are close to the usage purpose of the spectacles can be selected. Furthermore, in the manufacturing method of the present example, the basic parameters are not set by the information of one category within the main lifestyle information, but rather are set by the information of a plurality of categories within the main lifestyle information in order to grasp the lifestyle of the user from a plurality of different perspectives and to provide the most appropriate spectacle lenses to each individual user. For example, in the present example, as the main lifestyle information in the first category, the occupation information 1a.1 among the lifestyle is selected, and based upon the occupation information 1a.1, in step 12a, the first basic parameter can be selected. Furthermore, as the main lifestyle information in the second category, hobby information 1a.2 among the lifestyle, is selected, and in the step 12b, based upon the hobby information 1a.2, the second basic parameter can be selected.

In the method of manufacturing a progressive multi-focal lens of the present invention, since the method is carried out for individual users from the design of the progressive surface, it is possible to prepare many kinds of patterns of the progressive multi-focal lens for multi-purposes. In FIG. 5, an example of the basic parameters which are prepared in the basic parameter file 51 of the present example is shown. In the present example, the width of the clear vision area (aberration if 0.50 D or less) in the horizontal direction of the distance portion at a fitting point of 7 mm above the upper rim of the progressive strip is arranged at intervals of 5 mm, from 5–50 mm and further, the width of the clear vision area in the horizontal direction of the near portion of 3 mm below the lower edge of the progressive strip is arranged at intervals of 2 mm from 2–20 mm, and these combinations are designed as basic parameters of the progressive surface which serves as a base. Therefore, in the basic parameter file 51, basic parameters which show 100 types of progressive surfaces are prepared in advance. In FIG. 5, the basic parameters are divided into the groups of "intermediate", which can be categorized as types that focus the intermediate visual field, "far-intermediate", which can be categorized as types that focus the far-intermediate visual field, "far-use" which can be categorized as types that focus the far-use visual field, "intermediate-near", which can be categorized as types that focus the intermediate-near visual field, "balanced", which can be categorized as types that balance far, intermediate, and near, "near-use", which can be categorized as types that focus the near-use visual field, and "far-near", which can be categorized as types that focus the far-near visual field. Needless to say, these basic parameters are not limited to the standard of these titles or divisions. Data in which each basic parameter corresponds to occupation is prepared in advance in an occupation file 52a shown in FIG. 6. For example, if, according to the spectacle lens and sales results in the past, it is found that it is generally preferable for an attorney to have a progressive multi-focal lens with the clear vision field with a distance portion of 20 mm and a near potion of 10 mm, then the basic parameter which is called "intermediate-near 4" is applied for the occupation of an attorney. Similarly, for the occupation of a physician, if it is found that it is generally preferable to have a progressive multi-focal lens with a clear vision field with a distance portion of 30 mm and a near portion of 12 mm, then the basic parameter of "intermediate-near 13" is applied. Therefore, in step 12a, the basic parameter which is suitable to the occupation of the user can be set by referring to the occupation file 52a.

Figure 7:
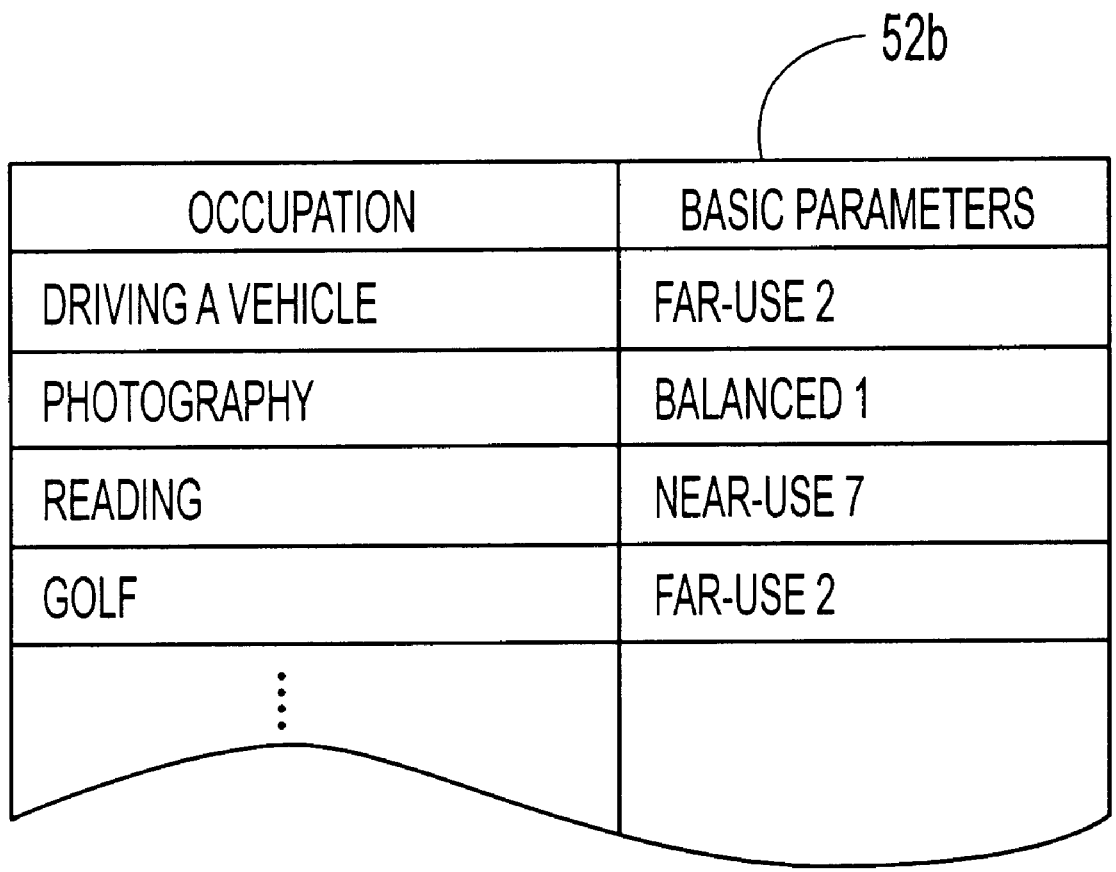
FIG. 7 is a table showing a schematic of a hobby file in which the basic parameters are set, based upon hobbies.

Furthermore, in the method of manufactuirng a progressive multi-focal lens of the present example, the hobby file 52a shown in FIG. 7 is also prepared. For example, when the hobby is driving, if there is a result showing that it is generally preferable to have a progressive multi-focal lens with a clear vision area with a distance portion of 50 mm and a near portion of 2 mm the basic parameter of "far-use 2" is applied. Therefore, in step 12b, by referring to the hobby file 52b, it is possible to arrange the basic parameter which is suited to the user's hobby. Needless to say, the basic parameters shown in FIGS. 6 and 7 are merely examples, and are arranged depending upon the spectacle lenses and sales results in the past, a follow-up investigation, and the like.

As described earlier, in the method of manufacturing a progressive multi-focal lens, even if the occupation is the same, the usage purpose of the spectacle and the position and width of the visual field needed vary, depending upon each individual user, and it is possible to provide a progressive multi-focal lens which is most suited to each individual user by supplying the main lifestyle information of a separate category which is called "hobby". For example, a user whose occupation is a physician and whose hobby is golf can obtain "intermediate-near 13" as a first basic parameter in step 12a and "far-use 2" as a second basic parameter in step 12b. These basic parameters are designed parameters which indicate the progressive surfaces of different types, and it is not possible to design a custom-made progressive surface as they are. Therefore, in the manufacturing method of the present example, as shown in FIG. 4, for subsidiary lifestyle information 1a.3, the percentage in which the user spends time on both occupation and hobby is included in the customized information 1 as lifestyle data. For example, if the percentage of golf as a hobby is approximately once a month, the frequency in use of the distance portion can be determined to be less, so the basic parameter of "balanced 4", which is upgraded two ranks from the first basic parameter related to occupation in the distance portion only as the least needed clear vision area, that is, the basic parameter that can ensure a clear vision area with a distance portion of 40 mm and a near portion of 12 mm, can be set. Because of this, the basic parameter adjustment process which adjusts the first and second basic parameters, set respectively in steps 12a and 12b, is arranged in a step 12c.

Furthermore, if the user has used his spectacles for many years, it is easy for him to have feelings of discomfort because not only the scope of the usual field is different but the aberration distribution in the progressive portion is greatly different when the width of the clear vision area of the new spectacle lens is greatly different when compared with the width of the clear vision area of the spectacle lens in the past. On the other hand, when the user feels dissatisfied with the spectacle lenses in the past because of a narrow visual field, for example, it is preferable to provide spectacle lenses which remove dissatisfactions such as this. Furthermore, for a user who wears the progressive multi-focal lenses for the first time, it is common for the user to worry about the limitation of the visual field and distortion of the image which are particular to the progressive lenses. Accordingly, spectacle lenses which focus the far-use with the wide clear vision area are preferable. As described earlier, depending upon the personal history of the user's spectacles, the specifications of the most appropriate spectacle lenses vary, so in the manufacturing method of the present example, as shown in FIG. 4, information 1k concerning the personal history of each user's spectacles is arranged in the customized information 1, and the correction process of the basic parameters which corrects the basic parameter provided in step 12c in the personal history information 1k is arranged in step 12d.

In response to steps 12a through 12d, in the basic parameter setting component 66 of the manufacturing apparatus 60 of the progressive multi-focal lens of the present example shown in FIG. 2, a fist basic parameter setting component 66a which sets the basic parameter corresponding to occupation from the occupation file 52a, a second basic parameter setting component 66b which sets the basic parameter corresponding to hobby from the hobby file 52b, a basic parameter corresponding to hobby parameter used in the design of the progressive surface according to the percentages of occupation and hobby, and further, the basic parameter correction component 66d which corrects a basic parameter by the personal history of the user, are provided.

[Correction of the far-use and near portions]

Next, in step 13, from a rotation angle 1b and convergence amount 1c included in the customized information 1, or from the user's way of using the line of sight from far-use to near-use, the width and position of the distance and near portions, which are set according to the above basic parameters, are corrected. In the present example, by the above customized information 1, a length of a progressive strip and change in addition power in the progressive strip and a shape of the progressive strip are obtained, and by this, the position determination of the near portion is eventually performed.

The rotation angle 1b can be included in the customized information 1 by measuring the maximum value, i.e., the largest rotation angle, which can be rotated downward from the horizontal sight line for each user. When the distance from the rear surface of the spectacle lens to a rotational center of the eyeball is defined as 25 mm, the position of the line of sight can be obtained on the lens at approximately 25×tan (A) mm when using the largest rotation angle A. For example, when the largest rotation angle A is 40°, the line of sight can be moved from the horizontal line of sight to approximately 20 mm downward on the lens surface. Accordingly, in this position of 20 mm downward, it is preferable to set a near portion area which is stable in terms of diopter. Because of this, the near-use starting point, that is, the lower rim of the progressive strip, is set approximately 17 mm downward from the position of the horizontal line of sight which is located at approximately 3 mm upward of the center of the lens. Furthermore, the line of sight of an ordinary user is often located approximately 5–6° below from the horizontal line of sight. This is called the "ordinary line of sight," and by considering this, a progressive starting point is set at approximately 2 mm downward from the position of the horizontal line of sight. Accordingly, for a user with a large rotation angle A such as this, the position determination of the near portion is performed as described above, and the length of the progressive strip is set at 15 (17–2) mm.

The convergence amount 1c is conventionally set at approximately 2.5 mm as a standard value for one eye on the lens, but actually, the convergence amount 1c varies for each user, depending upon the movement and adjustment power of the eye muscles. Furthermore, for the user with a habit of leaning his head when looking at something closely, it is sometimes preferable to change the convergence amount of right and left, and it is preferable to set the near portion in different positions on the right and left spectacle lenses. The convergence amount 1c of each user, for example, can be measured by approximately how many mm inward, i.e., towards the nose, from the position of the far-use line of sight the position of the near-use line of sight can be located. In the method of manufacturing the progressive multi-focal lens of the present example, the progressive surface is designed for each individual user so that habits of each individual user and the movement of the eyes as described above can be reflected and spectacle lenses can be provided which have progressive surfaces that further consider the different convergence amounts in the right and left eyes.

As described above, based upon the rotation angle 1b and convergence amount 1c which indicate, for each user, the movement when the line of sight for each user moves from the far-use to the near-use, as shown in FIG. 13, it is possible to set the positions such as a far-use center 72b of the distance portion 72 and a near-use center 73b of a near portion 73 in response to the user's needs. By so doing, the areas of the distance portion 72, the near portion 73, and a progressive portion 74 which connects these are determined, and further, a main focal visual line 75 can be set so that the basic specifications of the progressive surface area 71 can be determined.

Determination of the Base Curve and Degree Distribution

Next, the refractive power, i.e., diopter, of the far use portion 72 is determined in step 14. First of all, at step 15, a base curve is selected from the spherical power 1d which indicates the diopter of the customized information 1 and a cylindrical power 1c which indicates the astigmatism correction. In the present embodiment, as shown in FIG. 8, a look-up table which can select a base curve value by combining the spherical power 1d and cylindrical power 1e is installed in the base curve file 53. For example, an appropriate base curve can be set at units of 0.25 diopter (D) each for the spherical power 1d and cylindrical power 1e.

The base curve which gives the surface refractive power of the distance portion of the progressive lines can be predetermined by the relation of spherical power 1d and the astigmatism cylindrical power 1c under consideration of optical power, appearance, and whether it is physically possible to manufacture as a lens. Accordingly, the base curve of the distance portion is determined from the prescribed diopters, the spherical power and the astigmatism cylindrical power, which are included in the customized information 1. Moreover, the base curve of the near portion, as described in step 19, can be installed by adding a addition power 1f with respect to the base curve of distance portion. For example, in the case of a user with spherical power 1d of 1.50 D, a cylindrical power 1e of −1.00 D, addition power of 2.25 D as shown in FIG. 8, based on the base curve file 53, the distance portion base curve is set to 3.50 D, and the near portion base curve is set to 5.75 D.

When the far-use base curve is determined in step 15, distance portion horizontal diopter distribution which corresponds to the basic parameter which is determined by the information which is related the lifestyle 1a of the customized information is extracted from the distance portion diopter distribution file 54 in step 16. Concerning the diopter distribution, a look-up table which determines the distance portion diopter distribution corresponding to each basic parameter which is prepared in the basic parameter file 51 is prepared in the distance portion diopter distribution file 54, and the diopter distribution for every user can be determined by referring to this lookup table. As described above, the diopter distributions which relate to the pattern of several tens or more of the progressive surfaces can be prepared as a lookup table. Indeed, it is also possible to obtain the diopter distribution by using a function. Moreover, in step 17, the entire diopter distribution of the distance portion 72 is determined from the diopter distribution of the base curve in the horizontal direction. The determined diopter distribution is output to the diopter coordinate distribution data file 81.

Next, in step 18, the refractive power of the near portion 73 is determined. In this step, first of all, in step 19, the near portion curve is determined from the base curve which was determined in step 15 by the addition power 1f of the customized information. Further, as with the distance portion, the near portion diopter distribution is determined in step 20 based on the basic parameter which was set based on the lifestyle information 1a, by referring to the near portion diopter distribution file 55, and the diopter distribution of the entire distance portion 72 is determined in step 21. The determined near portion diopter distribution is output to the diopter coordinate distribution data file 81.

By doing this, the diopter distribution of distance portion 72 and the near portion 73 which is shown in FIG. 13 is determined, a refractive power, i.e., diopter, distribution of the progressive portion 72 is determined based on these areas in step 22. It is acceptable to determine the progressive portion of the diopter distribution by setting an approximately constant diopter change from the distance portion to the near portion but it is also possible to change according to the user's way of using the line of sight. In the manufacturing method of the present embodiment, since the position and the length of the progressive strip is determined in step 11, the diopter change of the progressive strip is determined from line of sight information 1g of the customized information in step 23. Therefore, by referring to the diopter distribution in the horizontal direction of the distance portion 72 and near portion 73 which are located at the top and bottom, the progressive strip diopter change is determined in step 24. With the above-mentioned steps, within the customized information 1, the information which should be reflected in the design of the progressive surface can be reflected in the design parameter of the progressive surface. In the present embodiment, ultimately, the diopter distribution of each area can be obtained. The ultimately determined diopter distribution of each area is output to the diopter coordinate distribution file 81, and is given to the subsequent process 6 which obtains the coordinates.

Different Method of Setting Design Parameters

In the above-mentioned, many basic parameters which determine the clear vision areas of the distance portion and the near portion which are the basis of the progressive multi-focus lens design are prepared in advance in the basis parameter file 51, and by selecting the optimum basic parameters within those through the user's customized information 1, and a manufacturing method which can custom-make the optimum progressive multi-focus lens for the individual user is exemplified. The present invention is not limited to this manufacturing method. A large progressive multi-focus lens type based on the main lifestyle information of occupation, for example, the far-use emphasis type, any of the far-middle near balanced type, or the near-use emphasis type are chosen. Moreover, any of a plurality of similar types based on hobbies, and it is possible to weight these by subsidiary lifestyle information and the basic parameters.

When the far-use emphasis type is designated a group A, the far-middle-near balanced type is designed as Group B, and the near-use emphasis type is designated as group C, the occupations suited to using these types of spectacles, for example, can be divided as shown in FIG. 9. Similarly, the hobbies suited to using these types of spectacles can be divided as shown in FIG. 10. It is possible to set the basic parameters which show the width and the position of the clear vision areas of the distance portion and near portion for group A, group B and group C and other design parameters such a spherical power distribution. When the selection results of the occupation and the hobby indicate the same type, the design of the progressive multi-focus lens can proceed using the design parameter which is set for each group. On the other hand, when the type of occupation and the type of the hobby are different, a weighting function W1 can be calculated according to the occupation to hobby ratio information for every user, and design parameters such basic parameters which are optimum for the user can be obtained.

$$\text{The optimum design parameter} = \text{the design parameter which is selected based on occupation} \times W1 + \text{the design parameter which is selected based on hobby} \times (1-W1) \quad (1)$$

There, the weighting function W1 is a weighting function according to the occupation.

For example, if the user equally uses the spectacles for the occupation and the hobby weighting coefficient W1 can be set at 50%. On the other hand, if the user uses the spectacles yeglasses 90% for the occupation, the weighting function coefficient W1 can be set to 90%. In the present embodiment, in this manner, the design parameter is installed based on the two main lifestyle information bases which have different categories, and by adjusting them with the subsidiary lifestyle information such as the ration of time which is spent on the user's occupation and hobby, a progressive multi-focus lens which suited to the individual user can be manufactured and provided.

Since the design parameters for an optimum spectacle lens which corresponds to the lifework of each user are thus determined, customized information which relates to the user's eyes, the same as in the above-mentioned manufacturing method. Moreover, in the present embodiment, based on the user's personal history information of using spectacle lenses, the optimum parameter which was set at the above-mentioned equation (1) can be further revised.

As one example, in the case of users who wear progressive multi-focus lenses for the first time, there is often concern about the limitation of the visual field and distortion of the image that are characteristic to the progressive multi-focus lens. Accordingly, the far-use emphasis, in short the progressive multi-focus lens which has a design close to group A, is favorable for this kind of user. Therefore, the optimum design parameter which is determined by the aforementioned equation (1), which was an optimum design parameter 1, can be revised by the below equation (2).

$$\text{Optimum design parameter 2} = \text{optimum design parameter 1} \times W2 + \text{design parameter of group } A \times (1-W2) \quad (2)$$

In this equation, the weighting function W2 is a value relating to the suitability of the user with respect to the progressive multi-focus lens. It can adopt a value of 0~1, however, approximately 0.1~0.7 appears to be preferable.

Moreover, it is possible to make the weighting function W2 to be a function of the user's addition power 1f. In the case of user with low addition power 1f, since the limitation of the visual field is small and distortion is also small, a value close to 1 is appropriate for the weighting function W2. On the other hand, for a user with large addition power 1f, the weighting function W2 is close to 0. In other words, a lens which is closer to the far-use emphasis type is clearer to wear for the beginner. The function which is shown in equation (3) below can be adopted.

$$W2 = \alpha - \text{ADD} \times \beta \quad (3)$$

Here, ADD is the addition power 1f, and α and β are coefficients which are set to obtain the appropriate weighting function W2 with respect to the addition power. For example, when α=0.8, β=0.2, and the addition power 1f is in a range of 0.50~3.50 D, the equation (3) takes a value of 0.1~0.7.

Moreover, in the case of the user who has already worn the progressive multi-focus lenses, information of whether the user was satisfied with the previously worn lenses can be reflected in a revision of the optimum design parameter 1. For example, in the case of the user who is satisfied with the previous lens, the optimum design parameter 3 can be obtained by below equation (4) below by using the previous progressive multi-focus lens type and the optimum design parameter 1.

$$\text{Optimum design parameter 3} = \text{optimum design parameter 1} \times (1-W3) + \text{design parameter of the previous progressive multi-focus lens type} \times W3 \quad (4)$$

Here, a weighting function W3 which has a value of 0~1 can be adopted.

Alternatively, it is also possible to analyze a design parameter which indicates the individual elements of a previous lens beforehand, and to correct the individual design parameter so that it becomes closer to the previous lens design parameter.

On the contrary, in the case of a user who is dissatisfied with the previous lenses, it is possible to revise the design parameter to especially improve the dissatisfactory portions. For example, with respect to a user whose previous lenses had too large distortion, and could not be worn, the previous lens design parameter and the optimum design parameter 1 are compared, and when it is favorable to lower the distortion, the design parameter of group A which has small distortion is weighted and added. Moreover, with respect to a user who is dissatisfied that the near portion is narrow, the design parameter of group C, which is the near-use emphasis type, is weighed and added, and the optimum design parameter can be obtained. By doing this, the design parameter which reflects the customized information which is related to the occupation of the individual user is determined, and further correction is added based on the customized information which is related to the individual user's eyes, as described above, and the diopter distribution of the progressive surface which reflects the customized information is obtained. By doing this, in the present invention, the customized information is converted to the optimum design parameter for the individual user by using the appropriate function, and a customized progressive multi-focal lens can be designed and manufactured.

Obtaining the coordinate data of the progressive surface

Figure 11:
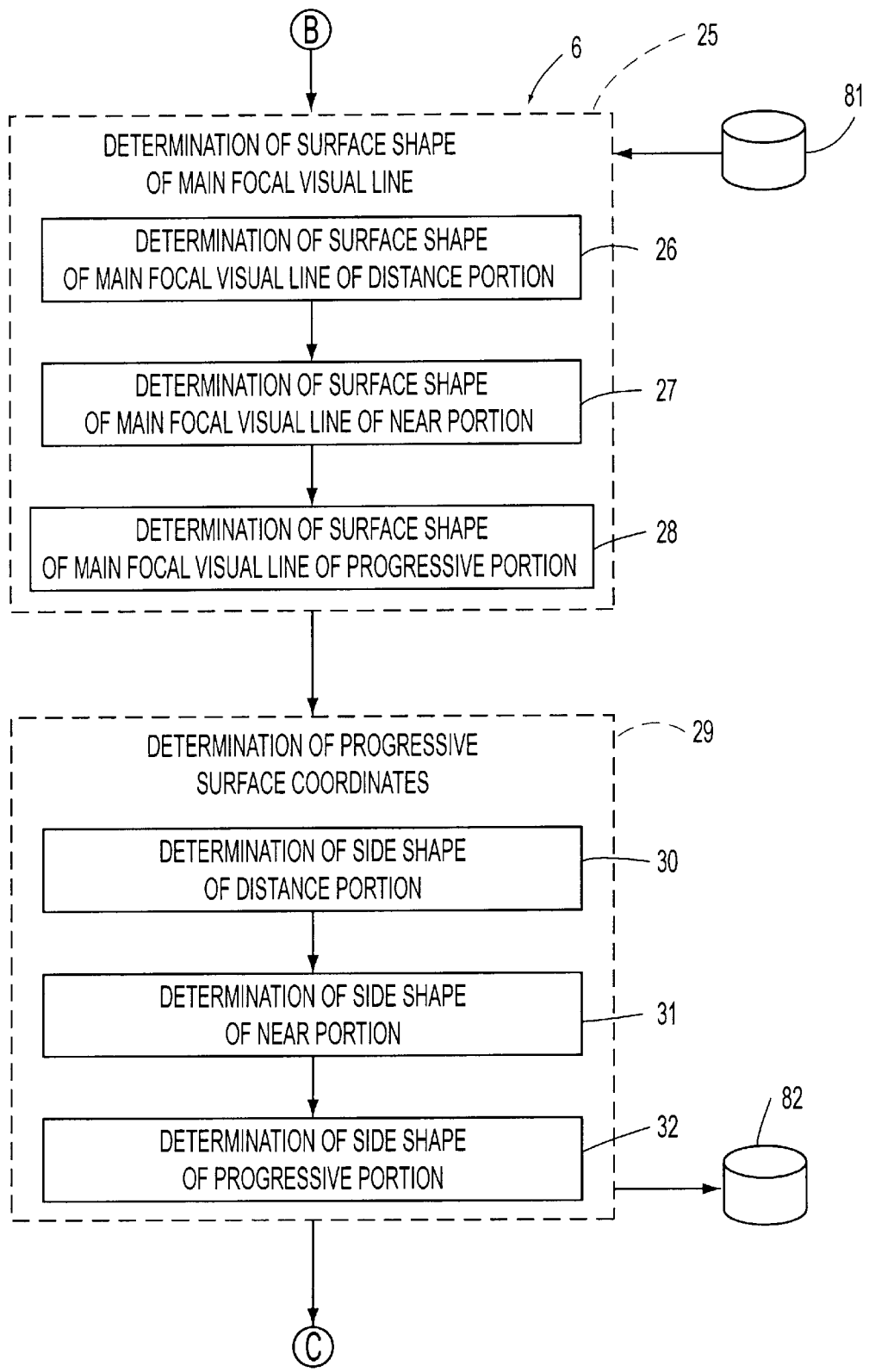
FIG. 11 is a flow chart which shows the process in further detail which designs the progressive surface by the design parameters from the flow chart shown in FIG. 1.

In FIG. 11, the processing at the process 6 which obtains the coordinates of the customized progressive surface area 71 and which is performed by the coordinate data obtaining component 62 is shown. In this processing, specifically, by connecting very small spherical surfaces which have radii of curvature corresponding to the diopter distribution of each point, the coordinates are calculated by one by one from the center of the lens towards the outer periphery. The radius of curvature R (m) of each point can be obtained by an equation in which diopter distribution is D (diopters) and the material index of refraction ratio of the lens is n.

$$R = (n-1)/D \quad (5)$$

First of all, in step 25, the surface shape which follows the main focal visual line 75 is determined. Normally, in many cases, the surface shape is determined by following the main focal visual line 75 so that the astigmatic aberration does not occur. However, it is also possible to have an astigmatism correction function or to insert a specified aberration for a different purpose. In step 26, in accordance with the diopter distribution of the distance portion 72 determined above, a surface shape which follows the main focal visual line 75 of the distance portion 72 is determined. Similarly, in step 27, a surface shape which follows the main focal visual line 75 of the near portion 73, and in step 28, a surface shape which follows the main focal visual line 75 of the progressive portion 74, are determined.

Next, in step 29, the coordinates of the progressive surface area 71 which extends from the main focal visual line 75 to the side is determined. First of all, in step 30, the far-use side shape is determined in accordance with the diopter distribution of the distance portion 72 which is determined by the customized information 1. Similarly, in step 31, the near-use shape is determined in accordance with the diopter distribution of the near portion 73 which is determined, and in step 32, the progressive strip side shape is determined in accordance with the diopter distribution of the progressive portion 74. Thus, the coordinates of the progressive surface, or in other words, a customized progressive surface area 71 is determined. This customized progressive surface area 71 is a personal progressive surface which is different depending on the individual user, and is a progressive surface which suits the user's eye condition and lifestyle. Accordingly, progressive surfaces which are easy to use and which provide a comfortable field of vision to each user can be provided.

Determination of Lens Shape

Figure 12A:
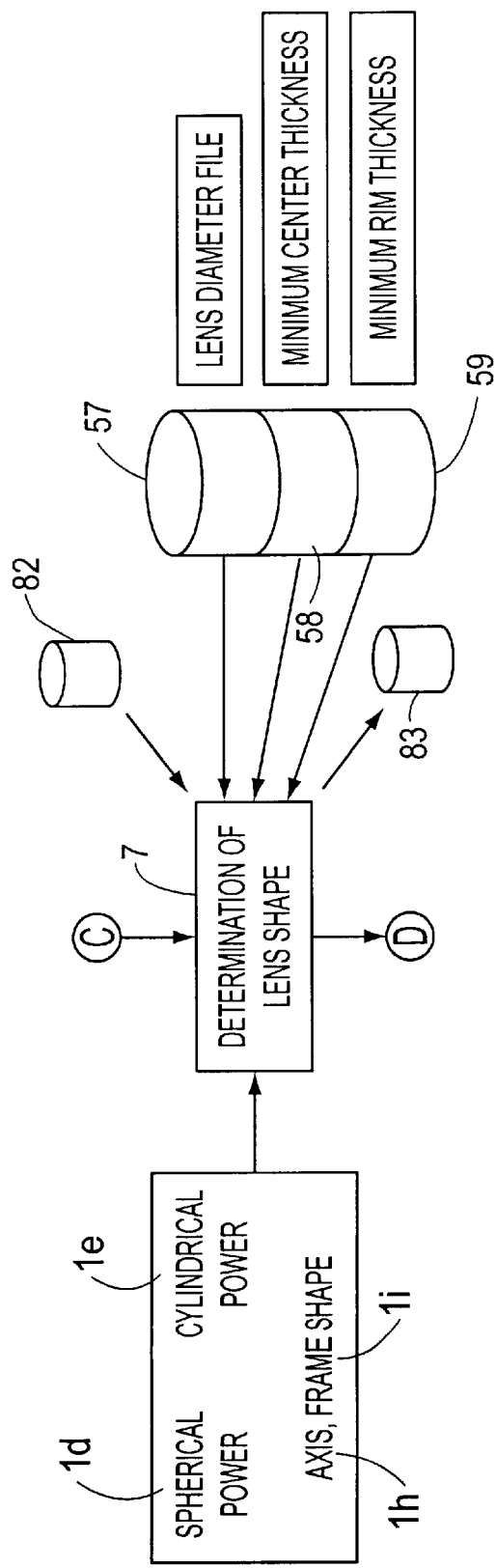
FIG. 12 is a flow chart showing the processes, respectively, in further detail which determine the formation of the lens and correct the optical performance capability.
Figure 12B:
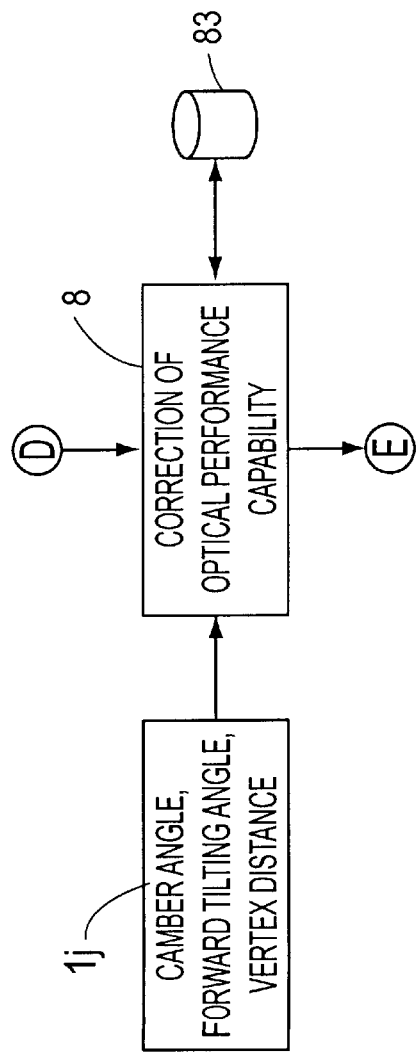

The progressive surface is determined as described above. Next, as shown in further detail in FIG. 12(a), the lens shape of step 7 is determined by the lens shape determining component 63. As for the lens shape, if the progressive surface area 71 is formed on the convex surface, it is necessary to determine the shape of concave surface. The back surface of the lens is normally a spherical surface of radius R1 or a toric surface shape which has radii R1 and R2, and it can be calculated by the following equation (6) when the base curve of the surface of the far-use position is D0 (diopters) and a center thickness is t (m).

$$R1=(n-1)/D1$$
$$R2=(n-1)/D1/D2$$
$$D1=D0/(1-t \cdot D0/n)-S$$
$$D2=D1+C \quad (6)$$

Here, S is a prescribed spherical power 1d of the customized information 1, and C is the astigmatism cylindrical power 1e.

Accordingly, the toric surface which forms the back surface of the lens is determined by the spherical power 1d and cylindrical power 1e of the customized information 1, and also by an astigmatism axis 1h which shows the direction of astigmatism. With respect to the user who has a prescribed positive diopter, since the center thickness t which is physically manufacturable is determined by the size of the lens, it is possible to evaluate the center thickness t by a frame shape 1i of the customized information and to determine the optimum lens thickness. Moreover, the curvatures R1 and R2 of the back surface vary according to this value of t. On the other hand, with respect to a user who does not designate the frame shape, since the lens can be set in accordance with a standard lens diameter, minimum center thickness and a minimum rim thickness, the shape of the back surface is calculated by using these values, and the progressive multi-focal lens is determined. Because of this, in the manufacturing method of the present invention, the lens diameter file 57, the minimum center thickness file 58 and the minimum rim thickness file 59 are prepared, and look-up tables are stored in these files so that the respective values can be obtained according to the spherical power and cylindrical power. Thus, the values which show the lens shape for each user, which are determined based on the coordinate data which is stored in the coordinate data file 82 are output to the lens shape file 83, and transferred to the next process.

Correction of the Optical Power

Moreover, in the manufacturing method of the present invention, the above-mentioned determined lens shape can be revised in further detail in step 8 by fitting data 1j of the customized information, such as a bending angle, a forward tilting angle and a vertex distance. For example, the vertex distance is normally 12 mm as a standard. However, it is commonly known that if the vertex distance is shifted from this value when the user wears the lens, the correction effect of the spectacle lens becomes lower, and the diopter actually perceived by the eyes is changed. Moreover, with a lens which comprises the astigmatic correction function, the astigmatic correction effect also changes. Accordingly, in this step 8, the condition in which the user actually wears spectacles is assumed, and the back surface of curvature R1 and R2 can be corrected to obtain the appropriate spherical diopter and astigmaticylindrical power. In a step 8 which does perform this kind of correction it is possible to use the light tracking method or the like, for example. Moreover, after the lens shape is determined, the astigmatic aberration at the actual eye position, and the distribution difference of the refractive power can be obtained, the progressive surface of the convex surface or the concave surface can be corrected to minimize these differences, and a addition power revision can be carried our which considers the shift of the adjustment effect by calculating the distance between the near portion and the cornea by using the bending angle or the forward tilting angle. The optical power of spectacle lens which is designed according to the individual user can be higher. In the present embodiment, since the progressive surface is designed for each individual user, and the lens shape is determined based on that, the design of the progressive surface or the lens shape can be corrected according to the wearing condition such a spherical power, body characteristics, wearing information or the like, of the spectacles of the individual user. Accordingly, it is possible to provide, spectacle lenses to the user which are optimum, even in the wearing condition.

Obtaining of Processing Data

As described above, when the lens shape which is output to the lens shape file 83 is finally determined, processing data to perform the NC process is created in step 9, and the actual lens processing is performed. Accordingly, processed progressive multi-focal lens becomes a customized lens which is suited to the user, and the lens can be supplied which can provide the most comfortable field of vision to the user. Moreover, since the conditions of the diopter of the user, the lifestyle, the fitting condition and the like are all reflected before the lens processing data is created, the processing is sufficient within one process, and the progressive multi-focal leans can be custom-made in a short time.

In process step 3, the progressive multi-focal lens is formed by processing the lens base material, and lens-shape processing is also performed to match the spectacle frames, and the spectacle lens which is shown in FIG. 13 is thereby formed and then shipped. Furthermore, at the request of the user, the adding of a color coat and a UV coat can be simultaneously performed.

As explained above, in the manufacturing method of the progressive multi-focal lens of the present invention, in accordance with customized information which is obtained from the user, the method starts with a process which designs the optimum progressive surface for the user, and a progressive multi-focal lens which has a custom-made progressive surface is processed and shipped. Accordingly, it is possible to customize a progressive multi-focal lens which has the optimum optical power to each person by matching the individual lifestyle, physical characteristics, wearing condition and the like of the progressive multi-focal lens user. Because of this, a progressive multi-focal lens can be obtained which has a more comfortable visual field than conventional ones with respect to the various users. Moreover, when the progressive multi-focus lens is manufactured, since it starts from the design of progressive surface, it is not necessary to store and to manage semi-finished lenses. Therefore, it is possible to lower the production cost, and to provide spectacle lenses which have optical power that satisfies the user.

Further, the example of when the convex surface or an object side is the progressive surface is described above, but it is also possible to structure the progressive surface on the concave surface of the eyeball side, and it is also possible to add the functions of the progressive surface and the toric surface to the concave surface side. Furthermore, depending on the request of the user, it is possible to perform a design which has fashionable elements. It is possible to provide the progressive multi-focus lens which suit the user's taste, is fashionable and has a superior optical power.

Moreover, for the software for lens designing which is explained above, the example is used in which many look-up tables are filed. However, it is possible to obtain the design parameter, lens data and data for correction by adding filed data, or by using an appropriate function or the like. Moreover, obviously, the design procedure of the progressive multi-focus lens is not limited to the procedure which is shown in the above-mentioned flow charts. Any software which can obtain an equivalent result is acceptable. Moreover, as for information which can be used at the time of customizing the progressive multi-focus lens, it is obvious that, even if only a portion of the above-described information is used, the effect of the present invention can still be obtained by starting with the design of the lens for each user from the progressive surface. Further, in addition to the customized information which is explained above, it is possible to provide a lens which more suitable to the user by reflecting various other information which relates to the user's eye condition or lifestyle.

Industrial Use Possibility

As explained above, in the present invention, a progressive surface which reflects the user's individual customized information is customized, and a progressive multi-focal lens which comprises the customized progressive surface is designed, and the optimum spectacle lens for the individual user can be customized. Accordingly, this is very different from the conventional way, which is to select the lens from among several kinds of lenses which comprise basic optical characteristics which were appropriately set by the manufacturer. It is possible to create and provide a progressive multi-focal lens which comprises optimum optical characteristic to the individual user. Accordingly, it becomes possible for the user to not select the lens from the spectacle lenses which are distributed in the market, but rather to purchase the optimum spectacle lens which are not only suited to his or her own eye's condition and lifestyle, but also his or her own preferences, and the user can obtain a very comfortable field of vision and enjoy life.

Moreover, by adopting the manufacturing method of the present invention, it is possible to completely eliminate the trouble and cost of producing and storing the semi-finished lens. Therefore, economical, optimum spectacle lenses can be provided to the user.

What is claimed is:

1. A method of manufacturing a progressive multi-focal lens which has a progressive surface that includes comprising a distance portion and a near portion which have different refractive powers, and a progressive portion between the distance portion and the near portion in which refractive power changes progressively, comprising the steps of:

obtaining customized information for an individual user including at least one of information concerning the individual user's eyes and information concerning a lifestyle of the user, designing the progressive surface based on the customized information to obtain processing data, and forming the customized progressive multi-focal lens with the progressive surface according to the processing data.

2. The method according to claim 1, wherein the step of designing the progressive surface further comprises the steps of:

determining design parameters of said progressive surface based on the customized information, and obtaining coordinates data of said progressive surface based upon said design parameters.

3. The method according to claim 2, wherein the step of designing the progressive surface further comprises the step of determining a shape of the progressive multi-focal lens with said progressive surface based upon said customized information.

4. The method according to claim 3, wherein the step of designing the progressive surface further comprises the step of correcting the shape of the progressive multi-focal lens in order to improve optical power based upon said customized information.

5. The method according to claim 2, wherein:

the step of obtaining customized information further comprises obtaining customized information that includes at least first main lifestyle information and second main lifestyle information in different categories concerning the lifestyle of said user, and subsidiary lifestyle information reflecting percentages in which each of said first main lifestyle information and second main lifestyle information affects the eyes of said user, and the step of determining design parameters further comprises setting basic parameters for a clear vision area of at lest one of said distance portion and said near portion based upon said first main lifestyle information, setting said basic parameters based upon said second main lifestyle information, and obtaining adjusted basic parameters by adjusting said basic parameters based upon said subsidiary lifestyle information, and using said adjusted basic parameters as said design parameters.

6. The method according to claim 5, wherein:

the step of obtaining customized information further comprises obtaining customized information that includes personal history information concerning eyeglasses of the user, and the step of determining design parameters further comprises correcting said adjusted basic parameters based upon said personal history information.

7. The method according to claim 5, wherein:

the step of obtaining customized information further comprises obtaining customized information that includes degree information concerning a degree of the eyes of said user, and the step of determining design parameters further comprises setting a base curve of at least one of said distance portion and said near portion based upon said degree information, preparing diopter distribution data, obtaining degree distribution data corresponding to said basic parameters from the diopter distribution data, determining a degree distribution of said at least one of said distance portion and said near portion, and determining the degree distribution of said progressive portion based upon the degree distribution of said distance portion and said near portion.

8. An apparatus for manufacturing a progressive multi-focal lens which has a progressive surface that includes distance portion and a near portion which have different refractive powers, and a progressive portion positioned between the distance use portion and the near portion in which refractive power changes progressively, comprising:

a lens design elements that designs the progressive surface of the progressive multi-focal lens based upon customized information of an individual user including at least one of information concerning eyes of the user and information concerning a lifestyle of the user, and obtains processing data of the progressive multi-focal leans, the lens design element including:

a design parameter determination component which determines design parameters of the progressive surface based upon said customized information, a coordinate obtaining leading component which obtains coordinate data of said progressive surface based upon said design parameters, a lens shape determination component which determines a shape of the progressive multi-focal lens with said progressive surface based upon said customized information, an optical power correcting component which obtains a corrected shape of the progressive multi-focal lens by correcting the shape of said progressive multi-focal lens based upon said customized information in order to improve optical power, a processing data creating component which obtains processing data of the corrected shape of said progressive multi-focal lens, a basic parameter file in which a plurality of basic parameters, among said design parameters, relating to a clear vision area of at least one of said distance portion and said near portion, are prepared in advance, a degree distribution data file in which degree distribution of said at least one of said distance portion and said near portion corresponding to the basic parameters is prepared in advance, and a base curve file in which a plurality of base curves that set surface refractive power of said distance portion are prepared in advance, wherein said design parameter determination component further includes:

a basic parameter selecting component which selects said basic parameters from among said basic parameter file based upon at least one of first main lifestyle information and second main lifestyle information, which have different categories concerning a lifestyle of said user and which are included in said customized information, a basic parameter adjusting component which determines said basic parameters to design the progressive multi-focal lens from among said plurality of basic parameters selected by said basic parameter selecting component based upon subsidiary lifestyle information reflecting percentages in which each of said first main lifestyle information and second main lifestyle information affect the eyes of said user, a base curve selecting component which selects a base curve of said distance portion and near portion from said base curve file based upon degree information included in said customized information, a first degree distribution determination component which determines degree distribution of at least one of said distance portion and said near portion based upon degree distribution data of said degree distribution data file, and a second degree distribution determination component which determines degree distribution of said progressive portion based upon the degree distribution of said distance portion and said near portion.

9. The apparatus according to claim 8, wherein said design parameter determination component further comprises a basic parameter correcting part which corrects said basic parameters based upon personal history information concerning spectacles of the user which is included in said customized information.

10. A progressive multi-focal lens which has a progressive surface that includes a distance portion and a near portion which have different refractive powers, and a progressive portion between the distance portion and the near portion in which refractive power changes progressively, the progressive multi-focal lens being manufactured by a method comprising the steps of:

obtaining customized information for an individual user including at least one of information concerning the individual user's eyes and information concerning a lifestyle of the user, designing the progressive surface based on the customized information to obtain processing data, and forming a customized progressive multi-focal lens with the progressive surface according to the processing data.

11. The progressive multi-focal lens according to claim 10, the progressive multi-focal lens being manufactured according to a method further comprising modifying the progressive multi-focal lens to a shape of a spectacles frame to form a lens-shape processed spectacle lens.

12. An apparatus for manufacturing a progressive multi-focal lens having a progressive surface with a distance portion, a near portion and a progressive portion disposed between the distance portion and the near portion, the distance portion having a far-use refractive power, the near portion having a near-use refractive power different from the far-use refractive power and the progressive portion having a progressively changing refractive power changing progressively between the far-use refractive power and the near-use refractive power, the apparatus comprising:

a data component for receiving and storing user data including at least one performance characteristic of an eye of a user and at least one lifestyle characteristic of the user; and a lens forming device operative to read the user data from the data component and to automatically form the progressive multi-focal lens based upon the user data read from the data component such that the far-use refractive power, the near-use refractive power and the progressively changing refractive power of the progressive multi-focal lens enable the user to see properly from the user's eye.

* * * * *